(12) United States Patent
Hall et al.

(10) Patent No.: US 12,496,641 B2
(45) Date of Patent: Dec. 16, 2025

(54) POCKET HOLE JIG

(71) Applicants: Taylor James Hall, Palatine, IL (US); James D. Walters, Aurora, IL (US)

(72) Inventors: Taylor James Hall, Palatine, IL (US); James D. Walters, Aurora, IL (US)

(73) Assignee: BAM IP Holding LLC, Saint Charles, IL (US)

( * ) Notice: Subject to any disclaimer, the term of this patent is extended or adjusted under 35 U.S.C. 154(b) by 729 days.

(21) Appl. No.: 17/466,486

(22) Filed: Sep. 3, 2021

(65) Prior Publication Data

US 2021/0394280 A1 Dec. 23, 2021

Related U.S. Application Data

(63) Continuation of application No. PCT/US2020/021206, filed on Mar. 5, 2020.

(60) Provisional application No. 62/845,678, filed on May 9, 2019, provisional application No. 62/814,701, filed on Mar. 6, 2019.

(51) Int. Cl.
*B23B 47/28* (2006.01)

(52) U.S. Cl.
CPC ........ *B23B 47/287* (2013.01); *B23B 2247/10* (2013.01); *B23B 2260/004* (2013.01); *B23B 2260/12* (2013.01); *B23B 2270/62* (2013.01)

(58) Field of Classification Search
CPC ............ B23B 2247/10; B23B 2260/12; B23B 2260/004; B23B 2247/12
See application file for complete search history.

(56) References Cited

U.S. PATENT DOCUMENTS

| | | | |
|---|---|---|---|
| 3,063,707 | A | 11/1962 | Kelley |
| 4,603,751 | A | 8/1986 | Erickson |
| 4,842,453 | A | 6/1989 | Raines et al. |
| 4,955,766 | A | 9/1990 | Sommerfeld |
| D343,628 | S | 1/1994 | Sclholtz |
| 5,297,643 | A | 3/1994 | Montgomery, Jr. et al. |
| D350,548 | S | 9/1994 | Bosten et al. |
| 5,375,636 | A | 12/1994 | Bosten et al. |
| 5,407,307 | A | 4/1995 | Park |
| 5,676,500 | A | 10/1997 | Sommerfeld |
| 5,791,835 | A | 8/1998 | Chiang et al. |
| 6,200,075 | B1 | 3/2001 | Gaskin et al. |

(Continued)

FOREIGN PATENT DOCUMENTS

| | | | | |
|---|---|---|---|---|
| CA | 2468382 A1 | * | 11/2005 | ........... B23B 47/287 |
| CA | 2542223 A1 | | 10/2006 | |

(Continued)

OTHER PUBLICATIONS

Kreg Jig Mini—SIMPLE; Kreg Jig Mini; pages printed from the internet; known to applicant on or before Apr. 27, 2016; 6 pages; "https://www.kregtool.com/store/ . . . ".

(Continued)

*Primary Examiner* — Ryan Rufo
(74) *Attorney, Agent, or Firm* — Reinhart Boerner Van Deuren P.C.

(57) ABSTRACT

A pocket hole jig that provides a vacuum attachment for waste debris removal is provided. A pocket hole jig that allows for adjustably positioning a clamp assembly is provided. Methods of operating pocket hole jigs are provided as well.

18 Claims, 20 Drawing Sheets

(56) References Cited

U.S. PATENT DOCUMENTS

| | | |
|---|---|---|
| 6,254,320 B1 | 7/2001 | Weinstein et al. |
| 6,394,712 B1 | 5/2002 | Weinstein et al. |
| 6,481,937 B1 | 11/2002 | Sommerfeld et al. |
| D481,402 S | 10/2003 | Jenkins et al. |
| 6,637,988 B1 | 10/2003 | Park |
| 6,659,695 B2 | 12/2003 | Park |
| 6,726,411 B2 | 4/2004 | Sommerfeld et al. |
| D503,415 S | 3/2005 | Dembicks et al. |
| D528,930 S | 9/2006 | Degen |
| 7,101,123 B1 | 9/2006 | Weinstein et al. |
| 7,134,814 B1 | 11/2006 | Park |
| D533,571 S | 12/2006 | Degen |
| D538,622 S | 3/2007 | Jones et al. |
| D567,269 S | 4/2008 | Netzler |
| 7,374,373 B1 | 5/2008 | Park |
| 7,484,914 B1 | 2/2009 | Weinstein et al. |
| D590,684 S | 4/2009 | Budzik |
| 7,597,513 B2 | 10/2009 | Chiang |
| 7,641,424 B1 | 1/2010 | Sommerfeld et al. |
| 7,641,425 B2 | 1/2010 | Sommerfeld et al. |
| 7,670,089 B2 | 3/2010 | Chiang |
| 7,709,750 B2 | 5/2010 | Hashimoto et al. |
| 7,811,033 B2 | 10/2010 | Sommerfeld et al. |
| D635,001 S | 3/2011 | Adkins |
| 7,967,534 B2 | 6/2011 | McDaniel et al. |
| 7,976,252 B2 | 7/2011 | McDaniel et al. |
| 8,029,214 B2 | 10/2011 | McDaniel et al. |
| 8,052,358 B2 | 11/2011 | McDaniel et al. |
| 8,083,443 B1 | 12/2011 | Circosta et al. |
| D653,269 S | 1/2012 | Fischer |
| 8,128,321 B2 * | 3/2012 | Quinn .................. B23B 47/288 408/115 R |
| 8,231,313 B2 | 7/2012 | Sommerfeld et al. |
| 8,840,345 B1 | 9/2014 | Park |
| 9,782,837 B2 | 10/2017 | Pelkey |
| D809,032 S | 1/2018 | Cummings |
| D809,578 S | 2/2018 | Cummings |
| 9,969,042 B2 | 5/2018 | Clark |
| 10,022,808 B2 | 7/2018 | Chang |
| 10,144,068 B1 | 12/2018 | Poole et al. |
| D871,458 S | 12/2019 | Matsushima et al. |
| D872,147 S | 1/2020 | Hall |
| 10,646,933 B2 * | 5/2020 | Duginske ................ B23B 49/00 |
| D894,707 S | 9/2020 | Hall |
| D903,456 S | 12/2020 | Hall |
| 2002/0119692 A1 | 8/2002 | Burton |
| 2005/0089381 A1 | 4/2005 | Liu et al. |
| 2006/0206698 A1 | 9/2006 | Foucher et al. |
| 2006/0228180 A1 | 10/2006 | Sommerfeld et al. |
| 2007/0086867 A1 | 4/2007 | Kesterson et al. |
| 2007/0280795 A1 | 12/2007 | McDaniel et al. |
| 2007/0280796 A1 | 12/2007 | McDaniel et al. |
| 2007/0280797 A1 | 12/2007 | McDaniel et al. |
| 2008/0075546 A1 | 3/2008 | Lin |
| 2008/0099101 A1 | 5/2008 | Chiang |
| 2008/0219786 A1 | 9/2008 | Sommerfeld et al. |
| 2009/0053003 A1 | 2/2009 | Clark |
| 2011/0164935 A1 | 7/2011 | McDaniel et al. |
| 2014/0341665 A1 | 11/2014 | Clark |
| 2016/0046001 A1 | 2/2016 | Clark et al. |
| 2016/0158850 A1 * | 6/2016 | Fisher .................... B25B 5/145 408/97 |
| 2017/0087644 A1 | 3/2017 | Pelkey |
| 2017/0297119 A1 | 10/2017 | Chang |
| 2018/0071835 A1 | 3/2018 | Poole et al. |
| 2018/0141133 A1 * | 5/2018 | Clark ...................... B23Q 3/06 |
| 2018/0185930 A1 | 7/2018 | Duginske |
| 2018/0214959 A1 | 8/2018 | Evatt et al. |
| 2018/0290217 A1 | 10/2018 | Asimakis |
| 2019/0030619 A1 | 1/2019 | Thackery |
| 2019/0047058 A1 * | 2/2019 | Pikarski ................ B23B 49/005 |
| 2019/0111499 A1 | 4/2019 | Evatt et al. |
| 2019/0176247 A1 * | 6/2019 | Chang .................. B23B 47/287 |
| 2019/0270143 A1 | 9/2019 | Duginske |
| 2019/0344362 A1 | 11/2019 | Hall |
| 2020/0030891 A1 | 1/2020 | Duginske |
| 2020/0222993 A1 † | 7/2020 | Clark |
| 2020/0238396 A1 | 7/2020 | Forbes et al. |
| 2020/0254532 A1 † | 8/2020 | Strempke |
| 2020/0282470 A1 | 9/2020 | Duginske |
| 2020/0298324 A1 | 9/2020 | Duginske |
| 2020/0391336 A1 † | 12/2020 | Clark |

FOREIGN PATENT DOCUMENTS

| | | |
|---|---|---|
| CN | 101100072 A | 1/2008 |
| CN | 101152724 A | 4/2008 |
| CN | 101157224 A | 4/2008 |
| CN | 102806376 A | 12/2012 |
| CN | 205485150 U | 8/2016 |
| EP | 1595627 A2 | 11/2005 |
| EP | 1712315 A1 | 10/2006 |
| EP | 1311364 B1 | 12/2006 |
| EP | 1862242 A2 | 12/2007 |
| EP | 1862243 A2 | 12/2007 |
| EP | 1862244 A2 | 12/2007 |
| EP | 2174737 A1 | 4/2010 |
| EP | 2179809 A1 | 4/2010 |
| EP | 2179810 A1 | 4/2010 |
| EP | 2223761 A1 | 9/2010 |
| EP | 2223762 A1 | 9/2010 |
| JP | H0841624 A | 2/1996 |
| JP | H0932199 A | 2/1997 |
| JP | 2001107411 A | 4/2001 |
| JP | 2006144748 A | 6/2006 |
| JP | 2006187498 A | 7/2006 |
| JP | 2008212213 A | 9/2008 |
| JP | 2009154265 A | 7/2009 |
| JP | 2014/237203 A | 12/2014 |
| JP | 2018066472 A | 4/2018 |
| KR | 20090036946 A | 4/2009 |
| KR | 20100008731 A | 9/2010 |
| KR | 20110133325 A | 12/2011 |
| WO | WO 2014/186595 A1 | 11/2014 |
| WO | WO 2016/025900 A1 | 2/2016 |

OTHER PUBLICATIONS

Magnetic Pocket Hole Jig, User Manual, 1 page; know to applicant on or before May 31, 2016.

PocketJig 200—Milescraft; http://www.milescraft.com/product/pocketjigkit200/; known to applicant on or before Aug. 7, 2018.

The Kreg Jig Timeline—Kreg Tool Company; https://www.kregtool.com/about-us/news/company-news/the-kreg-jig-timeline.aspx; known to applicant on or before Aug. 7, 2018.

Kreg Jigs—Joining Solutions—Kreg Tool Company; http://www.kregtool.com/Pocket-Hole-Jigs-Prodlist.html; known to applicant on or before Aug. 7, 2018.

General; Woodworking Tools and Instruments/General Tools/General Tools & Instruments; https://www.generaltools.com/hand-tools/woodworking-tools; known to applicant on or before Mar. 6, 2019.

Wolfcraft; wolfcraft-Products: Undercover Jig (4642000); https://web.archive.org/web/20120014161005/http://www.wolfcraft.de/jcatalog.generated/e . . . ; known to applicant on or before Mar. 6, 2019.

BlackJack; BlackJack Standard Pocket Hole System; https://weg.archive.org/web/20121214124010/http://store.workshopsupply.com/catalogue/bl . . . ; known to applicant on or before Mar. 6, 2019.

Kreg; Innovative Solutions for All of Your Woodworking and DIY Project Needs; https://www.kregtool.com/; known to applicant on or before Mar. 6, 2019.

Milescraft; Pocket Hole, 1321 Pocket Jig 100; http://www.milescraft.com/product/pocketjig100/ ; known to applicant on or before Jun. 5, 2017.

Milescraft; Instruction Manual Pocketjig100; www.milescraft.com; known to applicant on or before Mar. 2017.

Join-A-Jig By the Renovator—Wood Joining System; https://www.amazon.co.uk/Join-Jig-Renovator-Joining-System/dp/B01KTX8FF4; known to applicant on or before Mar. 6, 2019.

(56) References Cited

OTHER PUBLICATIONS

Ace Tool Trend Routing Technoloy; Trend PHJIG Ph/Jig Pocket Hole Jig; https://www.acetool.com/Trend-PHJIG-Ph-Jig-Pocket-Hole-Jig-p/tre-philg.htm?1 clid=CO . . . ; known to applicant on or before Mar. 6, 2019.

Axminster Tools & Machinery; UJK Technology Pocket Hole Jig Complete Kit—Pocket Hole Jigs—Pocket Hole Joinery; https://www.axminster.co.uk/ujk-technology-pocket-hole-jig-complete-kit-717273; known to applicant on or before Mar. 6, 2019.

Impakt; Impakt i2 Pro Pocket Hole Jig Cabinet Assembly System for Woodworking Carpentry; https://www.walmart.com/jp/impakt-i2-Pro-Pocket-Hole-Jig-Cabinet-Assembly-Sysem-for . . . ; known to applicant on or before Mar. 6, 2019.

IMPAKET; Impact i1 Wooodworking Pocket Hold Jig for 2 inch face frames in 3/4 inch wood; https://www.walmart.com/ip/Impake-it-Woodworking-ocket-Hole-Jig-for-2-inch-face-fra . . . ; known to applicant on or before Mar. 6, 2019.

CMT; CMT Pocket-Hole Jig; https:www.woodmagazine.com/review/joinery-tools-jigs/pocket-hole-jigs/cmt-pocket-hole . . . : known to applicant on or before Mar. 6, 2019.

Vacuum Adapter, posted Oct. 4, 2013 [online], [retrieved Jan. 25, 2024]. Retrieved from internet, https://www.amazon.com/ Works HO P-Wet-Dry-Adapter-WS25055A/dp/B00FX2R2LK (Year: 2013).

Jig Dust Kit, posted Mar. 20, 2009 [online], [retrieved Jan. 25, 2024]. Retrieved from internet, https://www.amazon.com/ Trend-MT-DUSTKIT-Dust-KiUdp/B001 UQ50YK (Year: 2009).

\* cited by examiner
† cited by third party

POCKET HOLE JIG

CROSS-REFERENCE TO RELATED PATENT APPLICATIONS

This patent application is a continuation of U.S. PCT Application No.: PCT/US2020/021206, filed Mar. 5, 2020, which claims the benefit of U.S. Provisional Patent Application No. 62/845,678, filed May 9, 2019, and U.S. Provisional Patent Application No. 62/814,701, filed Mar. 6, 2019, the entire teachings and disclosure of which are incorporated herein by reference thereto.

FIELD OF THE INVENTION

This invention generally relates to pocket hole jigs.

BACKGROUND OF THE INVENTION

Pocket hole jigs are used to form pocket holes in a working surface of a workpiece such that a fastener can be installed into the workpiece at a non-perpendicular and non-parallel angle to the working surface.

One problem associated with pocket hole jigs is that depending on the material of the workpiece, waste debris generated due to the drilling process can plug the guide channels that guide the drill bit that forms the pocket holes.

Another problem associated with pocket hole jigs is configuring the pocket hole jig to clamp workpieces of different thicknesses relative to the drill guides.

The present invention provides improvements over the current state of the pocket hole jig art.

BRIEF SUMMARY OF THE INVENTION

A new and improved pocket hole jig is provided. The new and improved jig provides improvements over the current state of the art for pocket hole jigs. Methods of use are also provided.

In one embodiment, a pocket hole jig include a first drill guide and a vacuum attachment is provided. The first drill guide includes a first workpiece support and a first guide channel extending through the first workpiece support between a first drill bit inlet and a first drill bit outlet. The first drill guide includes a first debris evacuation opening in fluid communication with the first guide channel. The vacuum attachment removably mounts relative to the first drill guide. The vacuum attachment has an inlet in direct fluid communication with the first debris evacuation opening. This allows material removed from a workpiece to exit the guide channel.

In one embodiment, the vacuum attachment is removably mountable directly to the first drill guide as opposed to some other structure.

In one embodiment, the first drill guide defines a first vacuum attachment mounting channel. The first debris evacuation opening is in fluid communication with the first vacuum attachment mounting channel. At least part of the vacuum attachment is slidably receivable within the first vacuum attachment mounting channel. The inlet of the vacuum attachment aligns with the first debris evacuation opening when the vacuum attachment is mounted within the first vacuum attachment mounting channel.

In one embodiment, the first vacuum attachment mounting channel is a hole through the first drill guide and defines a first inner peripheral shape. The vacuum attachment has a body portion that defines a first outer peripheral shape that mates with the first inner peripheral shape of the first vacuum attachment mounting channel.

In a preferred embodiment, the inner and outer peripheral shapes are not rotation symmetric.

In one embodiment, the first inner and first outer peripheral shapes are the same.

In one embodiment, the vacuum attachment includes a body portion that defines the inlet. The body portion defines an axis along which the first drill guide is adjustably positionable. The inlet of the vacuum attachment and the first debris evacuation opening remain in direct fluid communication when the first drill guide is at different relative positions along the axis.

In one embodiment, the pocket hole jig includes a second drill guide that is substantially the same as the first drill guide. The vacuum attachment is removably mountable relative to both the first and second drill guides simultaneously with the inlet of the vacuum attachment in direct fluid communication with the first and second debris evacuation openings.

In one embodiment, the vacuum attachment includes a body portion that defines the inlet. The body portion defines an axis. The first and second drill guides are adjustably positionable along the axis relative to the body portion. The first and second drill guides are adjustably positionable along the axis relative to one another to adjust a spacing between the first and second drill bit outlets. The first and second debris evacuation openings remain in direct fluid communication with the inlet of the vacuum attachment when the first and second drill guides are at different relative positions along the axis.

In one embodiment, the inlet of the vacuum attachment is provided by a plurality of openings in the vacuum attachment.

In one embodiment, the first and second work piece supports of the drill guides are substantially coplanar with one another for supporting a planar surface of a workpiece. The first and second guide channels extend at a non-parallel and non-perpendicular angle to the first and second workpiece supports.

In another embodiment, a pocket hole jig including a base, a clamp, a first drill guide and a mounting system is provided. The clamp assembly includes an actuatable clamp head. The first drill guide is operably mounted to the base. The drill guide defines a first workpiece support. The clamp head is actuatable towards the first workpiece support to provide a clamping force to clamp a workpiece between the clamp head and the first workpiece support. The mounting system mounts the clamp assembly to the base. The mounting system includes a slide arrangement and a blocking arrangement. The slide arrangement permits sliding the clamp assembly along an adjustment axis that is orthogonal to the first workpiece support between at least a first position and a second position defined by the blocking arrangement along the adjustment axis.

In one embodiment, the blocking arrangement includes first and second blocking members. The first blocking member defines a first abutment against which the clamp assembly abuts when the clamp assembly is in the first position along the adjustment axis. The second blocking member defines a second abutment against which the clamp assembly abuts when the clamp assembly is in the first position along the adjustment axis.

In one embodiment, the second abutment is positioned axially between the first abutment and the first workpiece support along the adjustment axis. The second blocking member is movable relative to the base so as to allow the clamp assembly to slide past the second blocking member as the clamp assembly transitions from the second position to the first position as the clamp assembly moves away from the first workpiece support along the adjustment axis.

In one embodiment, the second blocking member is operably rotatably attached to the base for rotation between a blocking position and an unblocking position. When the second blocking member is in the blocking position, the second blocking member will block the motion of the clamp assembly along the adjustment axis such that the clamp assembly cannot transition past the second position to the first position. When the second blocking member is in the unblocking position, the second blocking member will not block the motion of the clamp assembly along the adjustment axis such that the clamp assembly can transition past the second position to the first position.

In one embodiment, the second blocking member rotates about a mounting axis that is parallel to the adjustment axis.

In one embodiment, the slide arrangement includes a sled to which a clamp that includes the actuatable clamp head is operably attached. The clamp is operably actuatable to move the clamp head relative to the sled independent of motion of the sled relative to the base between a clamped position and an unclamped position. The sled is selectively moveable relative to the base to transition the clamp assembly between the first and second positions.

In one embodiment, the slide arrangement includes a slide member that extends generally parallel to the adjustment axis. The sled slides along the slide member between the first and second positions.

In one embodiment, the sled axially abuts the first abutment in the first position and axially abuts the second abutment in the second position.

In one embodiment, the first blocking member is an axially extending shaft support. The shaft support supports one end of the slide member. The second blocking member extends over the slide member when the second blocking member is in the blocking position and is pivoted away from the slide member when the second blocking member is in the unblocking position. The second blocking member may include a recess through which a portion of the slide member extends when the second blocking member is in the blocking position.

In one embodiment, the clamp head is adjustably mounted to the sled such that the position of the clamp head relative to the sled can be adjusted independent of actuation of the clamp head between the clamped position and unclamped position and independent of the motion of the sled relative to the base between the first and second positions.

In one embodiment, the blocking arrangement includes first and second blocking members. Each blocking member is moveable between a blocking position which inhibits motion of the clamp assembly away from the first drill guide along the adjustment axis and an unblocking position that allows the clamp assembly to move past the blocking member when moving away from the drill guide along the adjustment axis. A catch that operably cooperates with the first and second blocking member such that the second blocking member cannot be transitioned to the unblocking position without the first blocking member also being in or transitioned to the unblocking position.

In one embodiment, the catch also operably cooperates with the first and second blocking members such that the first blocking member cannot be transitioned to the blocking position from the unblocking position without the second blocking member also being in or transitioned to the blocking position.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
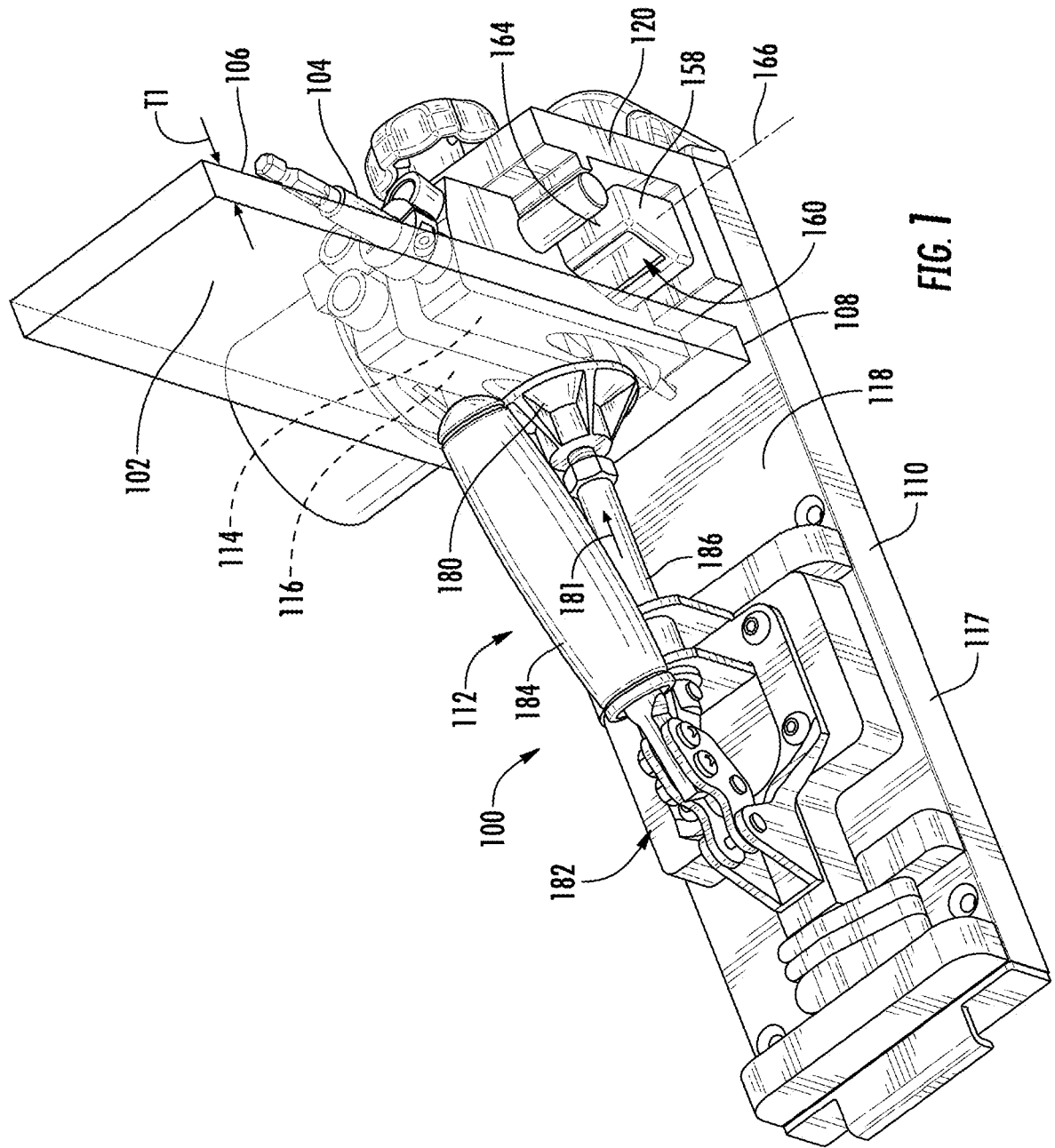
FIGS. 1 and 2 are perspective illustrations of the pocket hole jig clamping a workpiece thereto, with the pocket hole jig in a bench top configuration.
Figure 2:
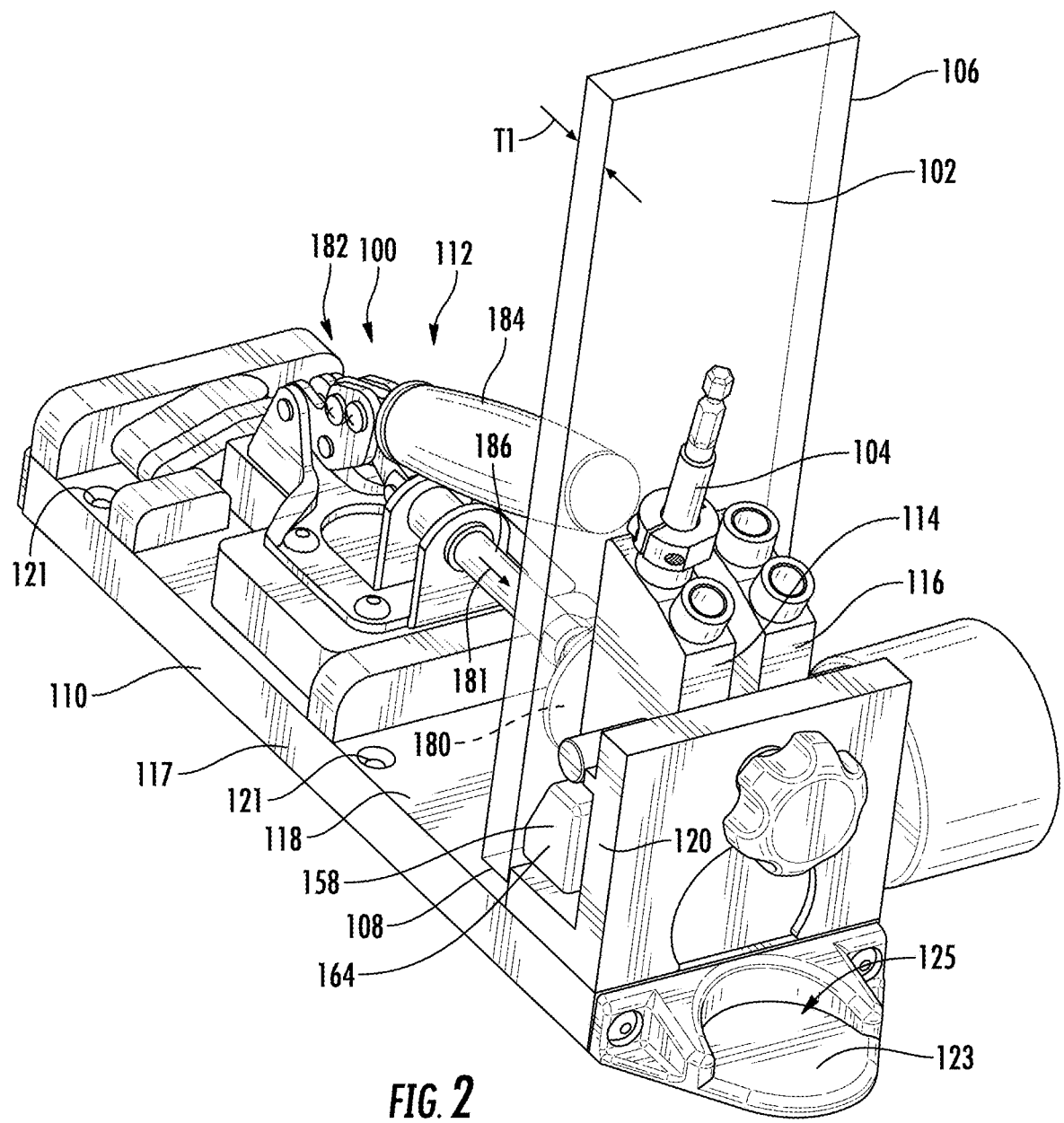

FIGS. 1 and 2 illustrate a pocket hole jig 100 for forming pocket holes in a workpiece 102 using a drill bit 104. The pocket hole jig 100 will support the workpiece 102 such that the pocket hole is formed at an angle relative to a working surface 106 of the workpiece 102 as is generally known to those of ordinary skill in the craft of woodworking.

Typically, the pocket hole will be drilled at an angle relative to the working surface 106 such that a screw or other fastener extending through the hole will extend through an adjacent, typically orthogonal, side 108 of the workpiece 102. The fastener will extend through side 108 and into a side of a second workpiece, not shown, to secure the two workpieces together.

The pocket hole jig 100 is configured to be able to form pocket holes into workpieces having different thicknesses T1. It is preferred to have the fastener as centrally located across the thickness T1 of the two adjacent workpieces.

Figure 3:
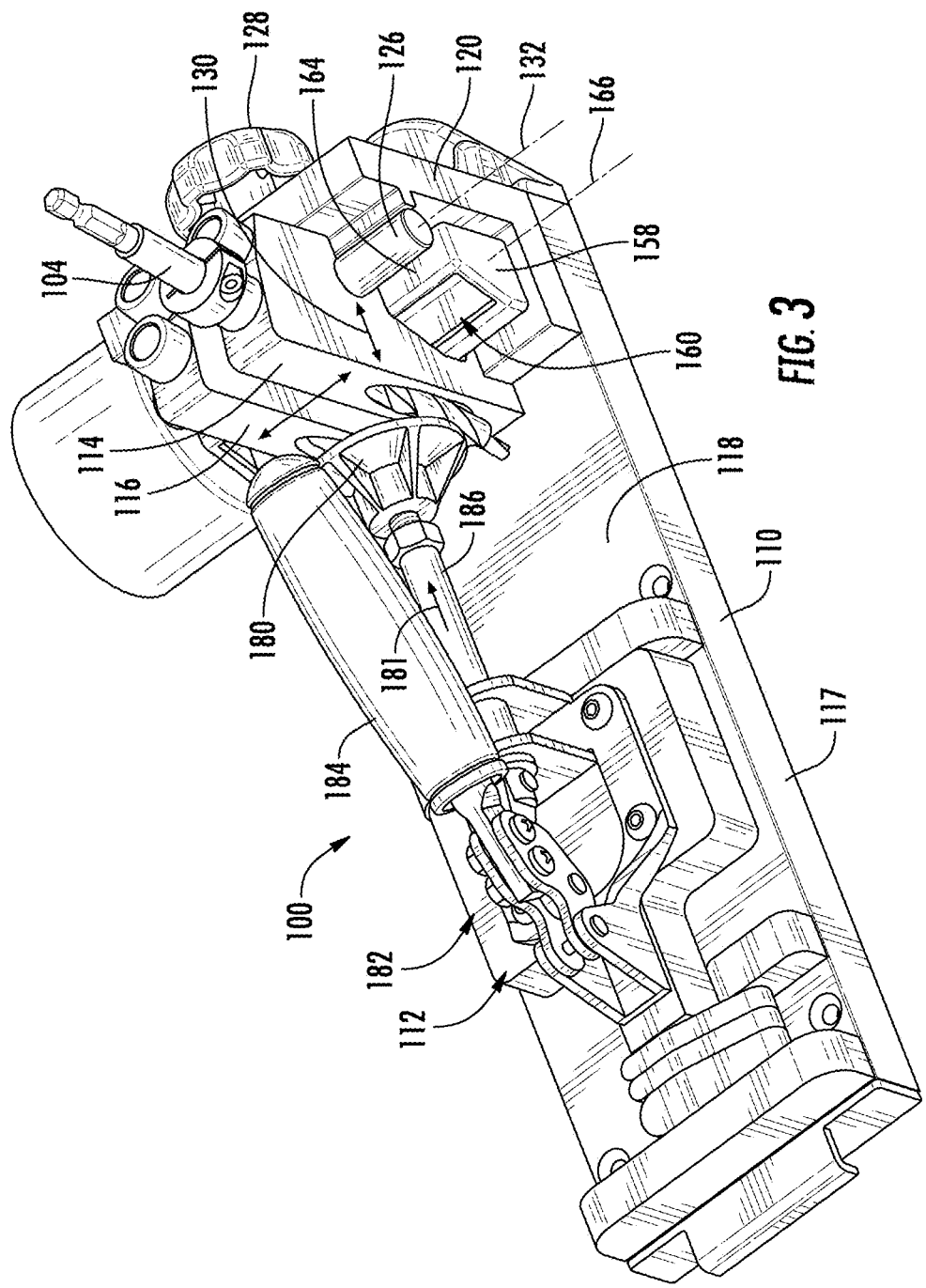
FIG. 3 is a perspective illustration of the pocket hold jig of FIGS. 1 and 2.

With additional reference to FIG. 3, the pocket hole jig 100 of the illustrated embodiment includes a base 110, a clamp assembly 112 and first and second drill guides 114, 116. The base 110 is designed to be mounted to a support surface of a workbench or other support apparatus. The clamp assembly 112 and first and second drill guides 114, 116 are operably mounted to the base 110. In this embodiment, the base 110 is an assembly of components including a base member 117 and a leg member 120.

Base 110 and particularly base member 117 is designed to be mounted to a work surface of a support device such as a table top, a work bench, saw horse, etc. This can be accomplished in multiple ways. Base member 117 includes a plurality of holes 121 through which screws or bolts can extend to screw or bolt the base member 117 to the support device (see e.g. FIG. 13 for holes 121).

Figure 13:
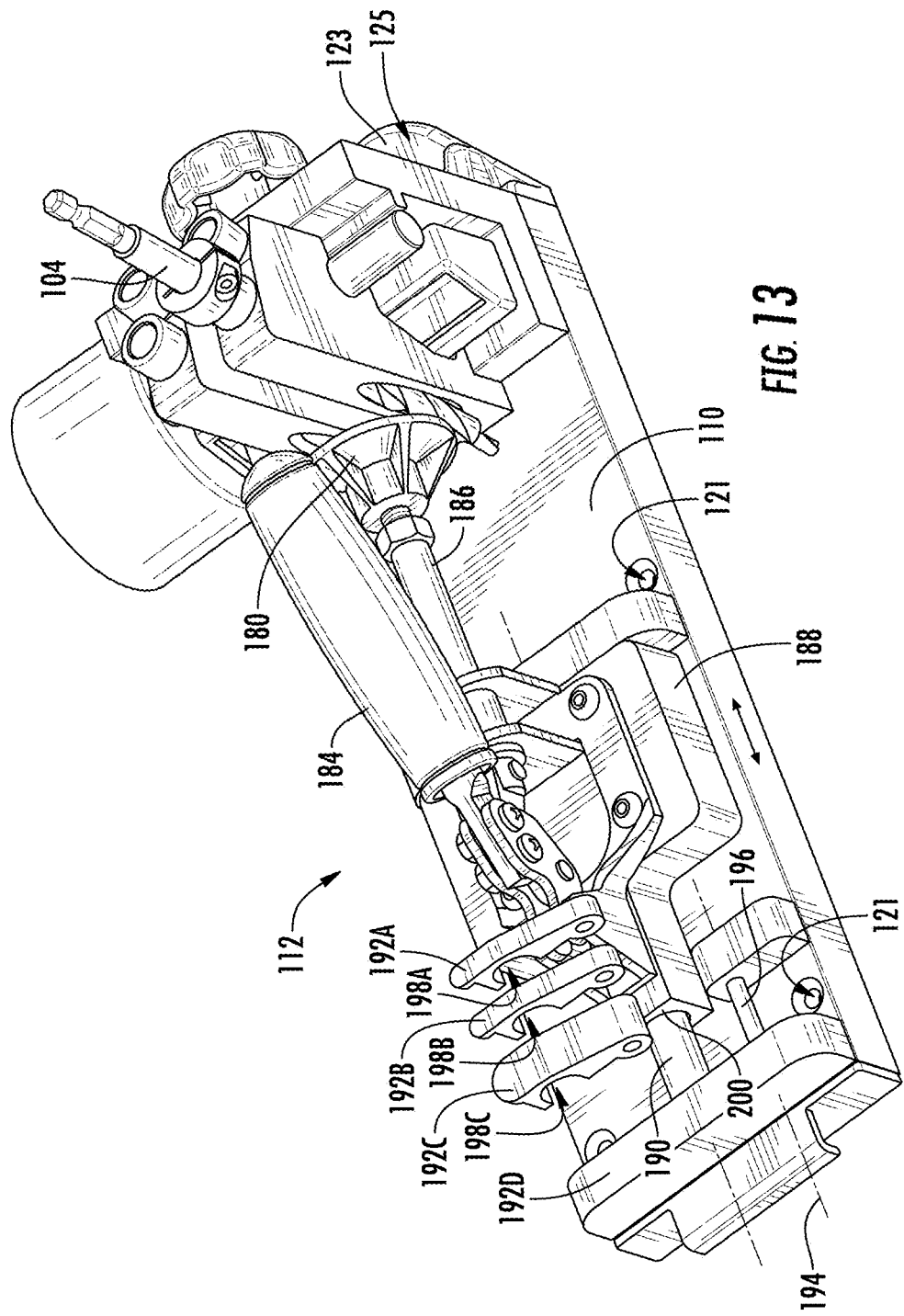
FIG. 13 is a partial exploded illustration of the pocket hole jig of FIGS. 1 and 2.

Additionally, in this embodiment, the base 110 includes a clamp receiver 123 also referred to as a clamp base (see e.g. FIGS. 2 and 13. The clamp receiver 123 includes a curved region 125 for receiving and/or locating a clamp head of a clamp. A clamp such as a C-clamp or a face clamp can be used with clamp receiver 123 for affixing the pocket hole jig 100 to the support device.

As illustrated in FIGS. 1 and 2, the workpiece 102 is supported on side 108 by a support surface 118 of the base while orthogonal working surface 106 is supported against the first and second drill guides 114, 116.

The first and second drill guides 114, 116 are substantially identical in this embodiment. The drill guides 114, 116 are mounted to leg member 120 of the base 110. Preferably, the drill guides 114, 116 can be removed from the leg member 120 and the drill guides 114, 116 can be adjustably positioned on the leg member 120 to adjust the location at which pocket holes can be formed in a particular workpiece 102. This can be used to adjust the positioning between adjacent pocket holes when multiple pocket holes are formed in a given workpiece.

Figure 4:
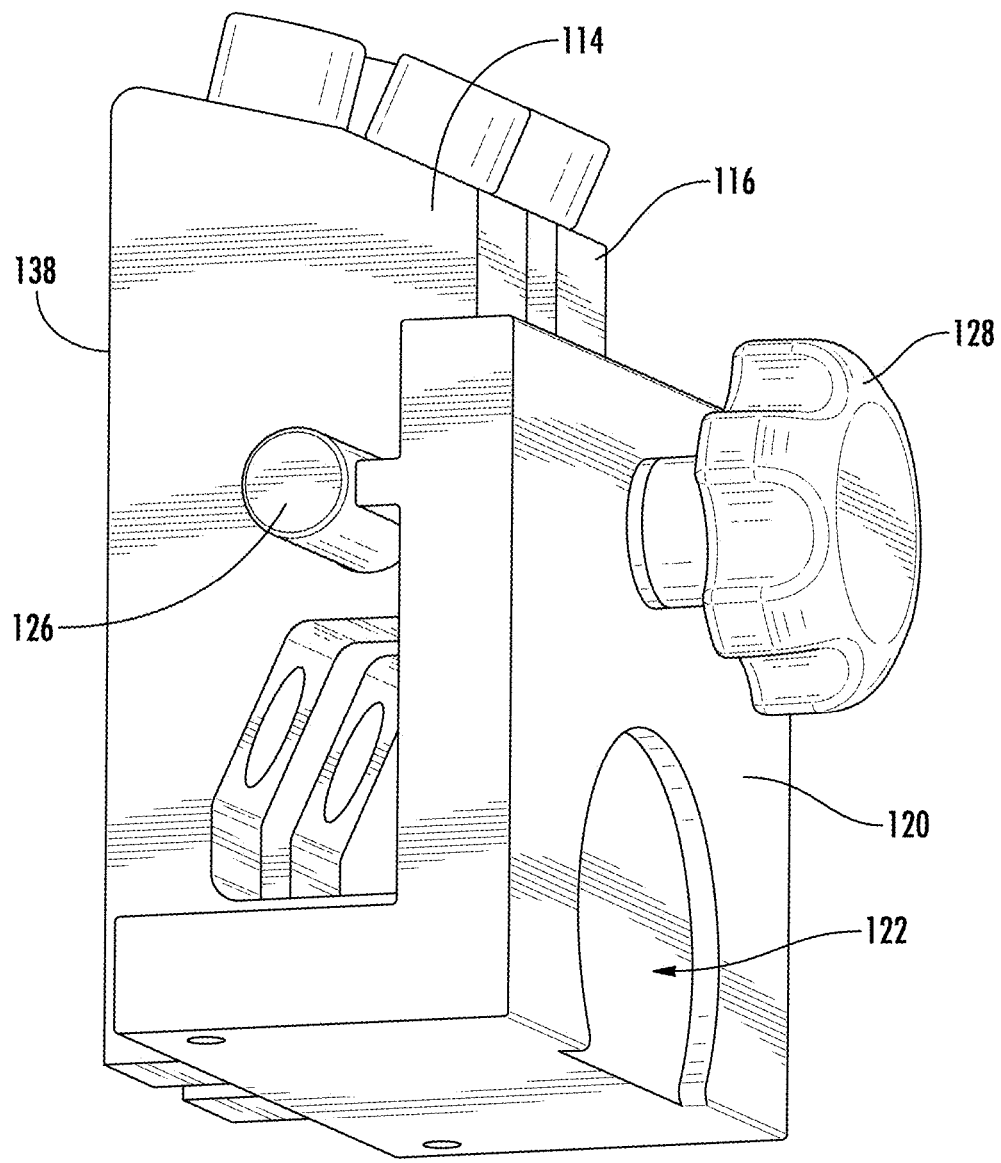
FIGS. 4 and 5 illustrate a portion of the pocket hole jig of FIGS. 1 and 2 being used as a portable pocket hole jig and being unmounted from the base of the pocket hole jig configuration in FIGS. 1 and 2.
Figure 5:
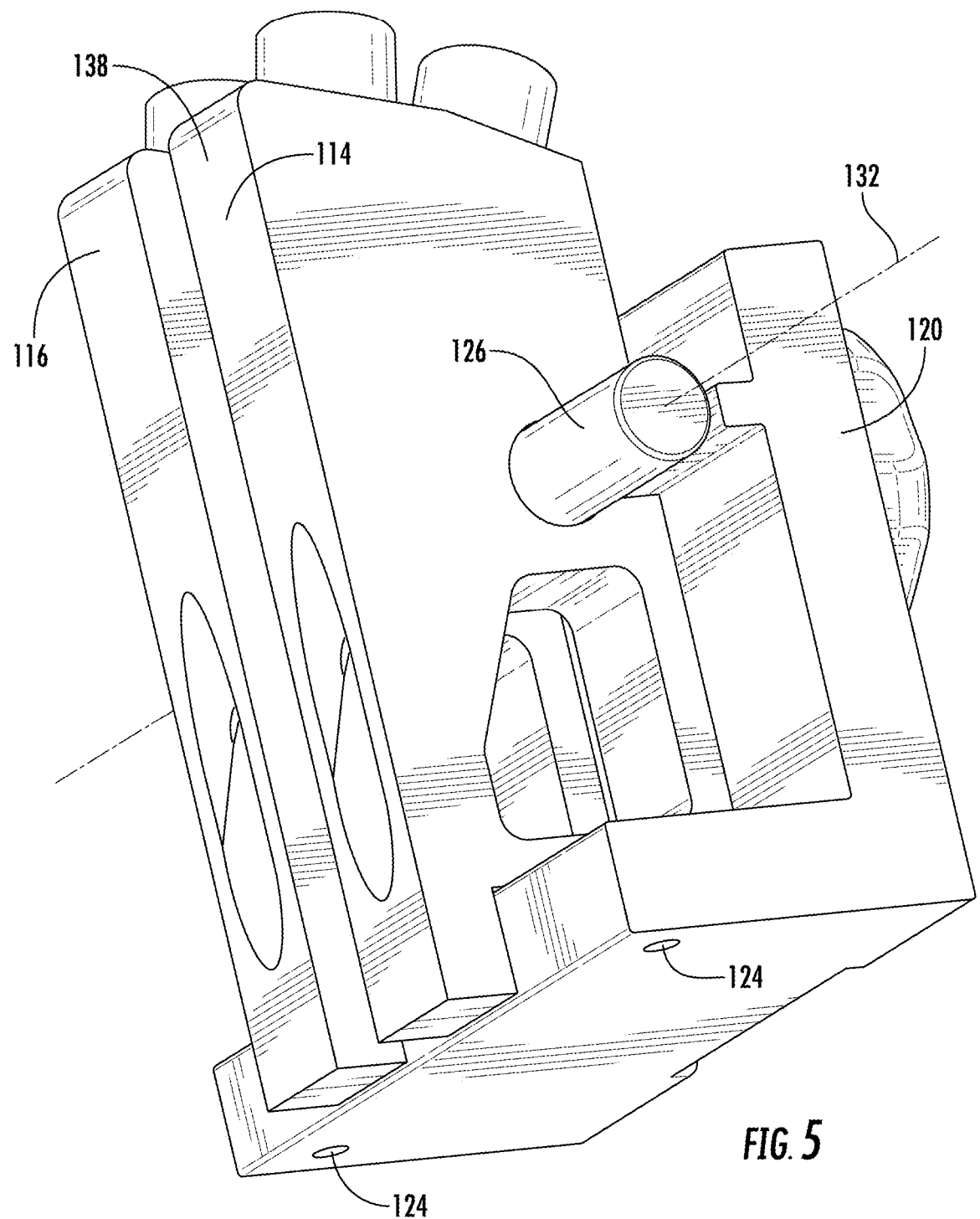

In this embodiment, the leg member 120 is removably mounted to the base member 117 so that the drill guides 114, 116 can be used as a portable pocket hole jig. FIGS. 4 and 5 illustrate the portable pocket hole jig configuration with the leg member 120 and the drill guides 114, 116 detached from the rest of pocket hole jig 100.

It is noted that leg member 120 includes a clamp head locating recess 122 that can be used to locate a clamp head of a clamp for clamping the removed portable pocket hole jig configuration to a workpiece. For example, a face clamp or c-clamp can be used to attach the portable configuration to a workpiece.

FIG. 5 illustrates screw holes 124 that are used to releasably attach the leg member 120 to the base member 117, such as by way of cooperating screws that extend through the base member 117.

Figure 17:
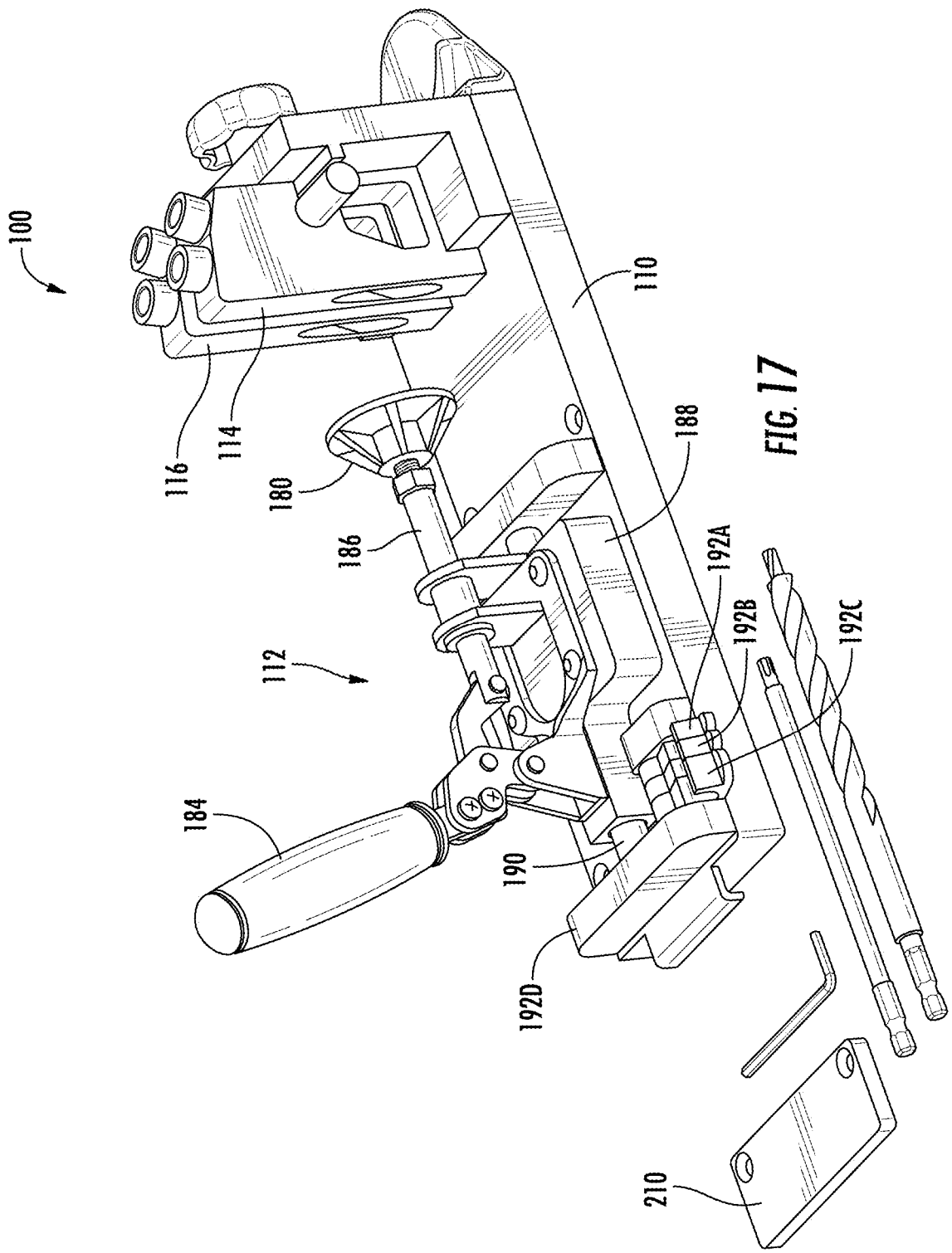
FIG. 17 illustrates the pocket hole jig of FIGS. 1 and 2 in an unclamped orientation.
Figure 18:
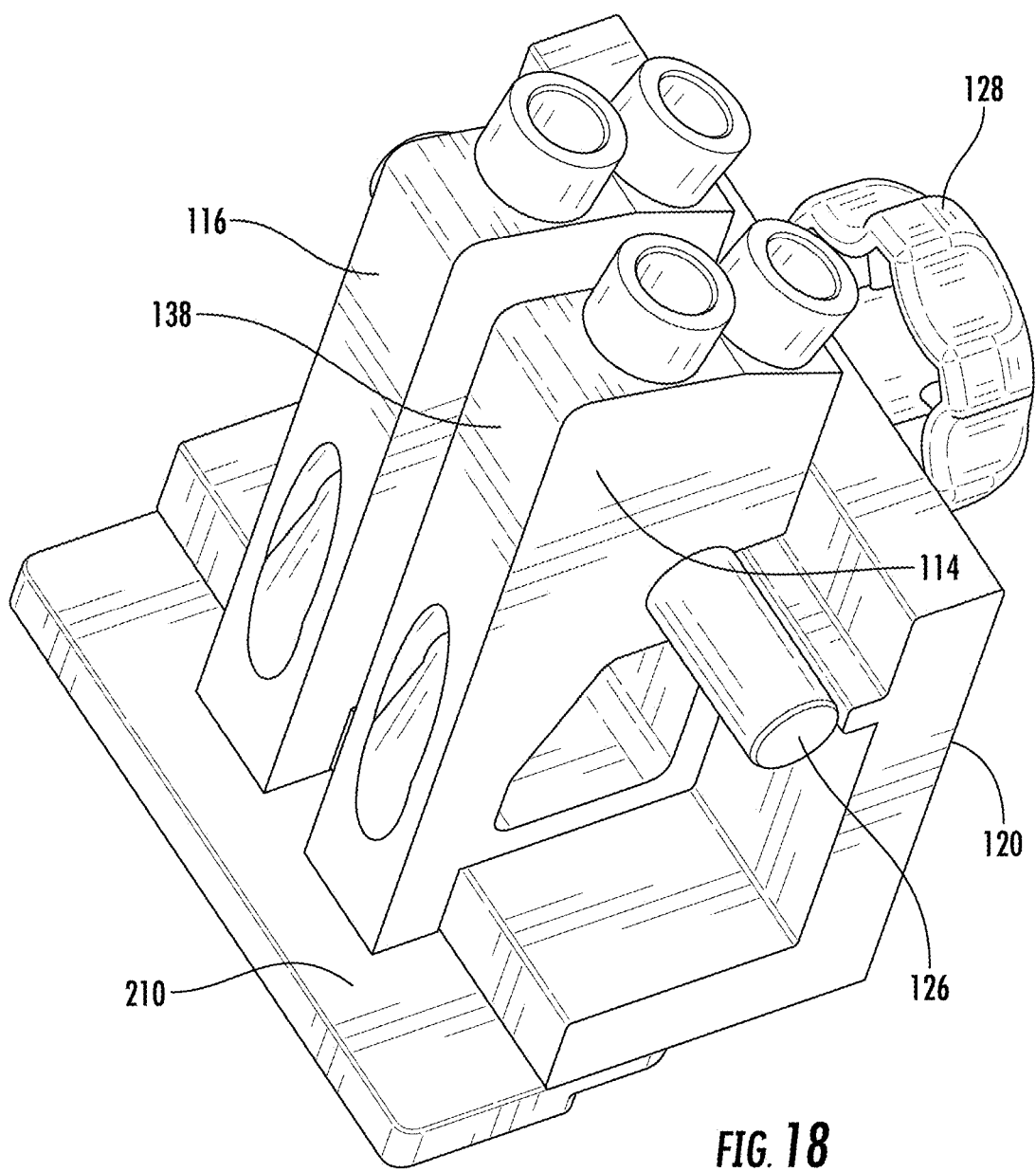
FIG. 18 is a perspective illustration of the portable pocket hole jig configuration.

While not illustrated in FIG. 4 or 5, a workpiece abutment member 210 (see FIGS. 17 and 18) may be secured to the bottom of leg member 120. The workpiece abutment member 210 will act as the support surface 118 of base 110 so as to properly align the assembly relative to an end/side of the workpiece when in the portable configuration. Holes 124 may be used to secure the workpiece abutment member 210 to leg member 120. When attached, workpiece abutment member 210 will extend outward beyond the workpiece support 138 of the drill guides 114, 116.

Figure 10:
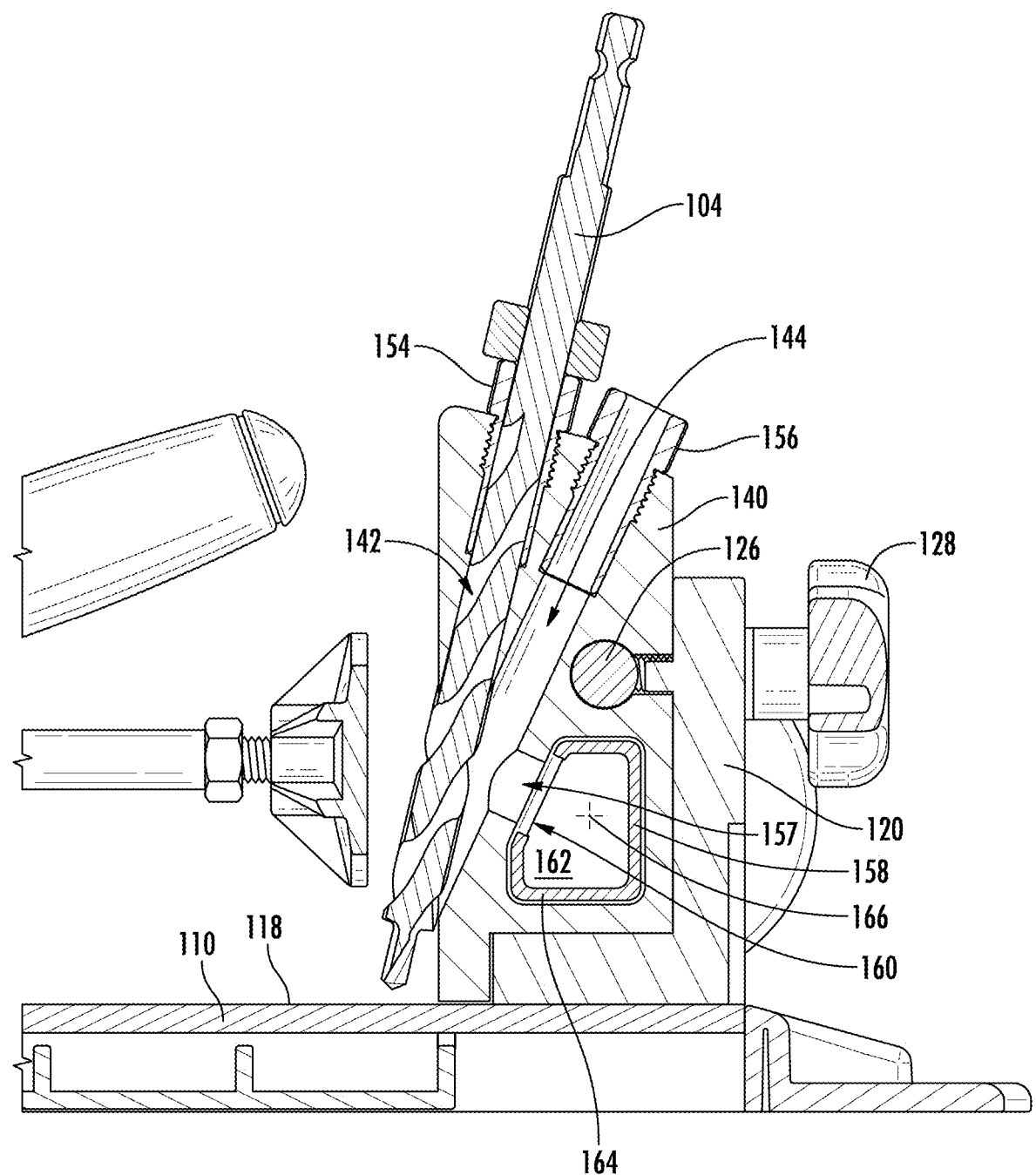
FIG. 10 is a cross-sectional illustration of a portion of the pocket hole jig of FIGS. 1 and 2.

With reference to FIG. 3, clamp bar 126 clamps the drill guides 114, 116 to leg member 120. More particularly, knob 128 is threadedly attached to clamp bar 126 (see e.g. FIG. 10) to release or clamp the drill guides 114, 116 against leg member 120, see e.g. arrow 130. With the clamp bar 126 in a released state, e.g. moved toward clamp assembly 112, the drill guides 114, 116 can be moved axially along an adjustment axis 132 defined by the clamp bar 126 to adjust the lateral position between the drill guides 114, 116 so as to adjust the spacing between adjacent pocket holes formed using the drill guides 114, 116.

In some embodiments, when the clamp bar 126 is released, the drill guides 114, 116 can be completely removed from the clamp bar 126 and consequently leg member 120.

When the knob is rotated in an opposite direction, the clamp bar 126 is pulled towards the leg member 120 pulling the drill guides 114, 116 against leg member 120 to fix their position along adjustment axis 132.

Figure 6:
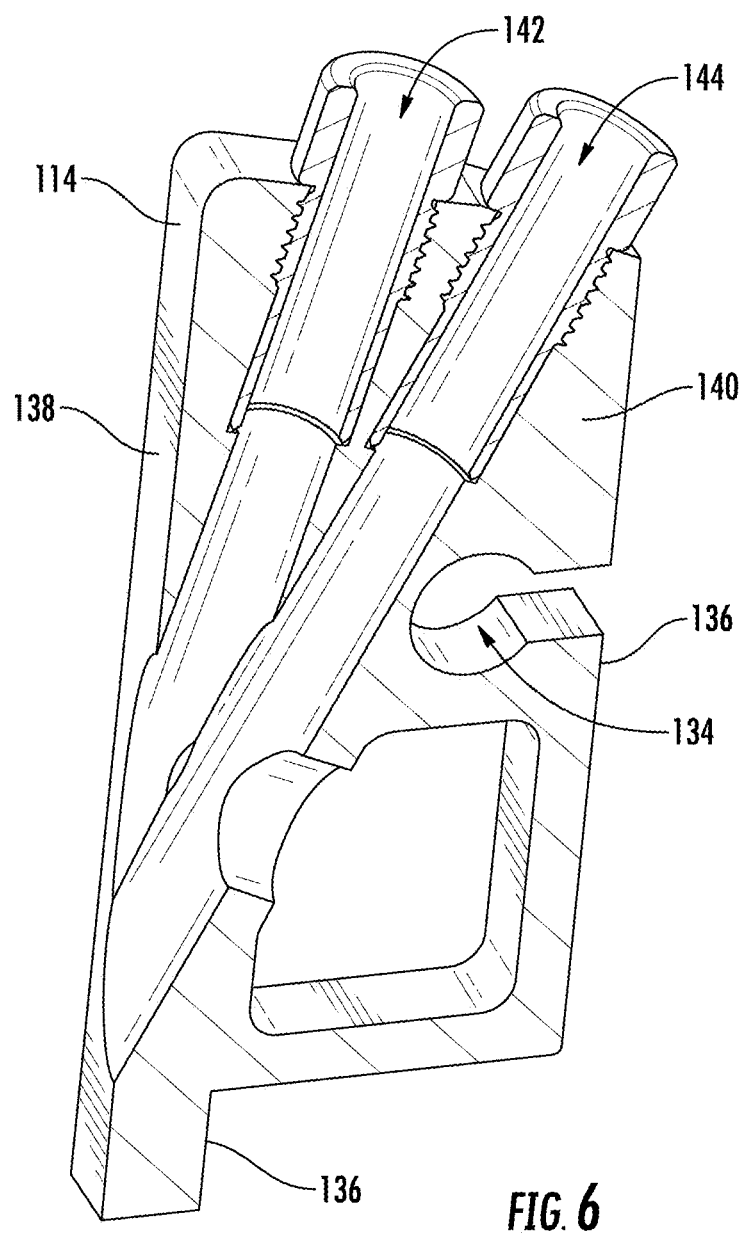
FIGS. 6 and 7 are partial cross-sectional illustrations of the drill guides of the pocket hole jig of FIGS. 1 and 2.
Figure 7:
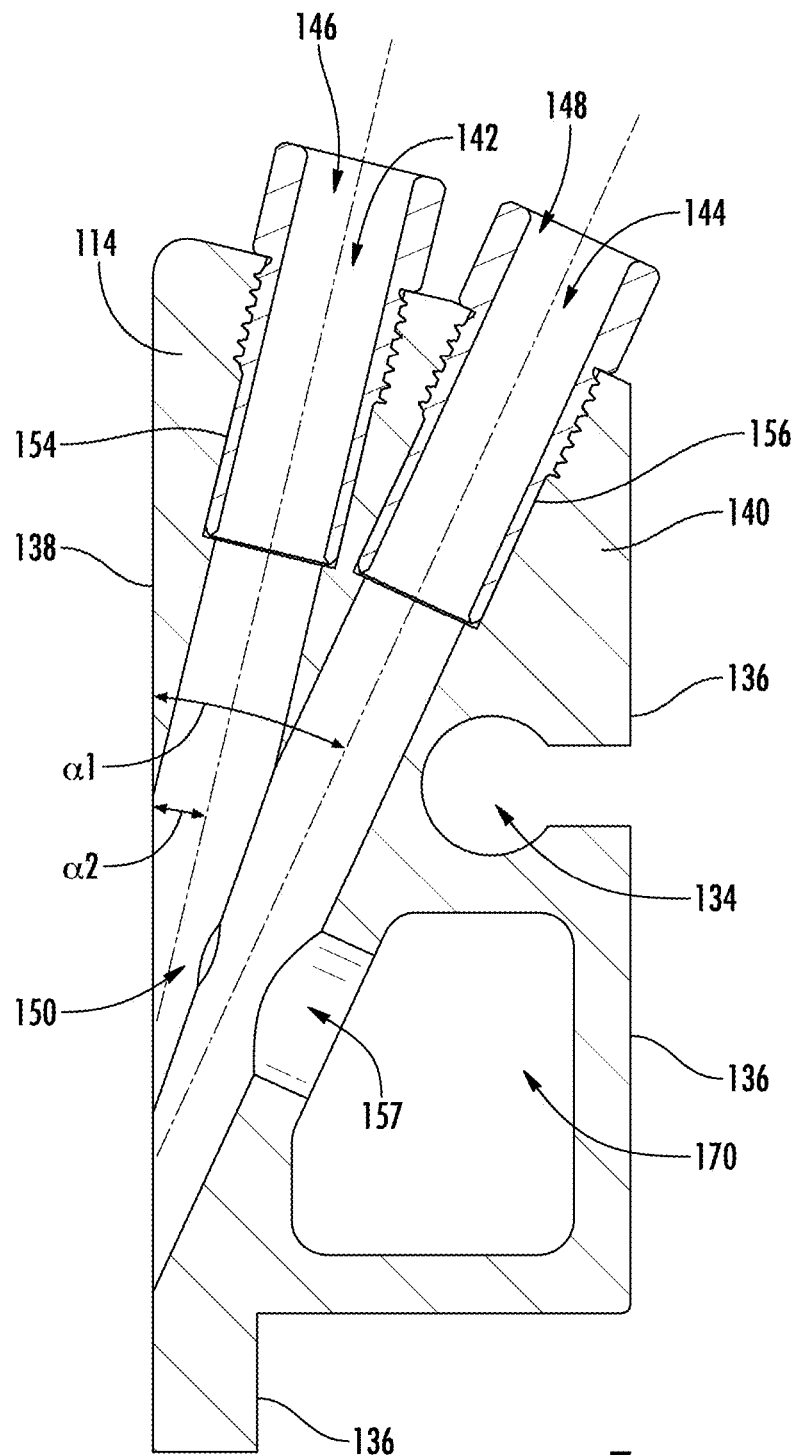

FIGS. 6 and 7 illustrate a drill guide 114 in cross-section. The drill guide 114 includes a clamp bar receiving slot 134 that receive the clamp bar 126 to allow the clamp bar to pull the drill guide 114 against leg member 120. More particularly, abutment surfaces 136 are pulled against corresponding surfaces of the leg member 120.

In this embodiment, the leg member 120 is illustrated as an L-shape including a foot portion and a leg portion. The foot portion provides increased stability of the leg member 120 when mounted to the base member 117. However, other configurations are contemplated. Further, as noted above, a screwed mounting arrangement is illustrated but other mounting arrangements such as dovetailing or other types of slotted mounting is contemplated.

The drill guides 114, 116 are substantially identical in the illustrated embodiment. The drill guides 114, 116 will be described with reference to drill guide 114 illustrated in FIGS. 6-9, but the features thereof will apply to both drill guides 114, 116. Drill guide 114 includes a workpiece support 138 against which the workpiece 102 is supported. In this embodiment, the workpiece support 138 is a planar surface of a drill guide body 140.

The drill guide 114 also includes a plurality of guide channels 142, 144 that extend between drill bit inlets 146, 148 and drill bit outlet 150. The drill bit outlet 150 extends through the workpiece support.

The guide channels 142, 144 extend at an angle relative to one another and intersect one another at drill bit outlet 150.

The different guide channels 142, 144 are used to drill pocket holes at different angles into a workpiece 102. Typically, the different guide channels 142, 144 provide for forming pocket holes into workpieces of different thicknesses T1. For example, guide channel 144, which extends at angle α1 relative to workpiece support 138 while guide channel 142 extends at angle α2 relative to workpiece support 138 that is different than angle α1. These angles are measured from a centerline of the corresponding guide channels 142, 144.

In some embodiments, such as the illustrated embodiment, the drill guide 114 includes guide inserts 154, 156 proximate the drill bit inlets 146, 148 that are formed of harder material than the drill guide body 140. This reduces undesirable wear to the shape of the guide channels 142, 144 and to maintain drilling of truer pocket holes for a longer period of time.

To avoid over heating or sticking of the drill bit 104 used to form the pocket holes due to debris build up within the guide channels 142, 144 while forming pocket holes, the drill guide 114 includes a debris evacuation opening 157 in fluid communication with the guide channels 142, 144. The debris evacuation opening 157 allows the waste formed during drilling to be removed from the guide channels 142, 144 without necessarily requiring backing the drill bit 104 out of the guide channels 142, 144.

A vacuum attachment 158 is removably mounted relative to drill guides 114, 116 (see e.g. FIGS. 1-3 and 10). In this embodiment, the vacuum attachment 158 is directly mounted to the drill guides 114, 116. However, it could be mounted to other structure, but in a similar orientation or position relative to the debris evacuation openings.

Figure 11:
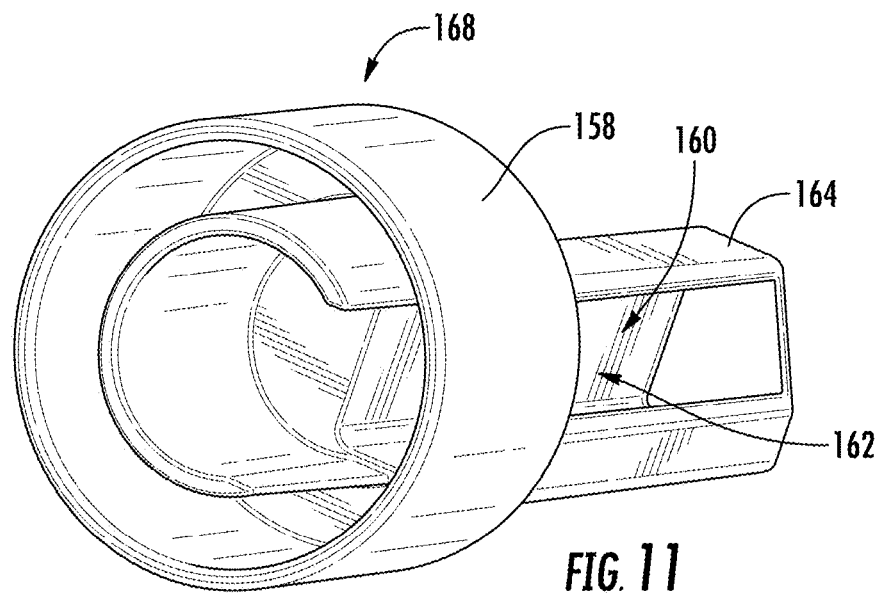
FIGS. 11 and 12 are perspective illustrations of a vacuum attachment of the pocket hole jig of FIGS. 1 and 2.
Figure 12:
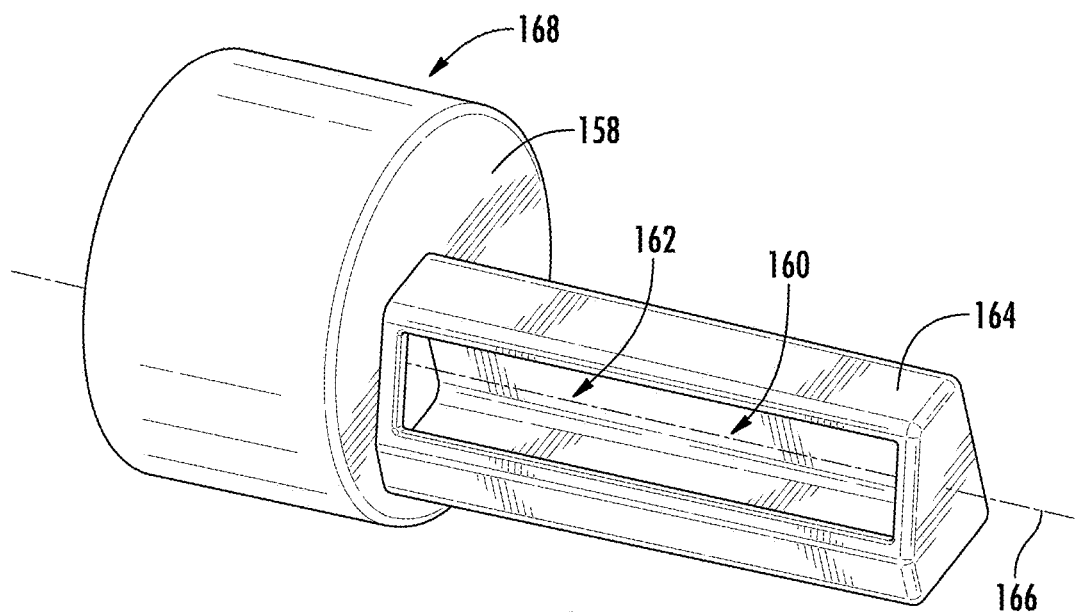

FIGS. 11 and 12 illustrate the vacuum attachment 158 removed from the drill guides 114, 116.

The vacuum attachment 158 includes a debris inlet 160 that communicates with a suction chamber 162. The debris inlet 160 is in direct fluid communication with the debris evacuation opening 157 of the drill guides 114, 116. Thus, waste material that is removed from the workpiece 102 during drilling operations can be vacuum removed from the guide channels 142, 144 via suction provided by vacuum attachment 158 within the suction chamber 162.

The vacuum attachment 158 includes a body portion 164 that defines debris inlet 160 and suction chamber 162. The body portion 164 defines a longitudinal axis 166. The debris inlet 160 is an elongated slot formed into the body portion 164 along axis 166. The drill guides 114, 116 are axially positionable along axis 166 while maintaining the debris evacuation opening 157 of the drill guides 114, 116 in fluid communication with debris inlet 160 at different relative positions along axis 166. This allows for adjusting the lateral spacing between the drill guides 114, 116 to form pocket holes with different relative positions, while still allowing for debris removal.

The vacuum attachment 158 includes an attachment interface 168 for connecting the vacuum attachment 158 to a source of vacuum. Typically, the source of vacuum will be a shop vacuum such as a portable wet dry vacuum and the vacuum attachment 158 will connect to a flexible hose of the shop vacuum using attachment interface 168. In other instances, the vacuum attachment could be connected to a dust collector, such as a dust collector regularly found in woodworking shops.

The body portion 164 extends axially outward from the attachment interface 168. The attachment interface 168 can be sized and configured to mate with different sized hoses so that it can be used with different mechanisms for providing vacuum.

Figure 8:
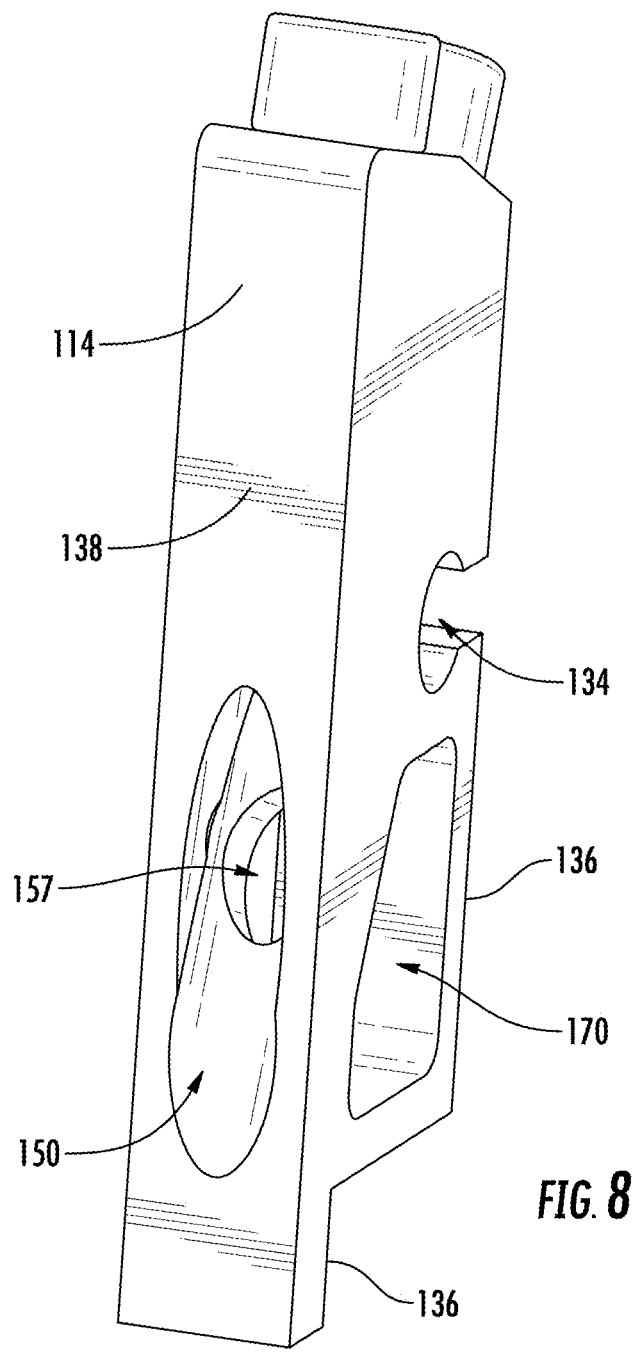
FIGS. 8 and 9 are perspective illustrations of the drill guides of the pocket hole jig of FIGS. 1 and 2.
Figure 9:
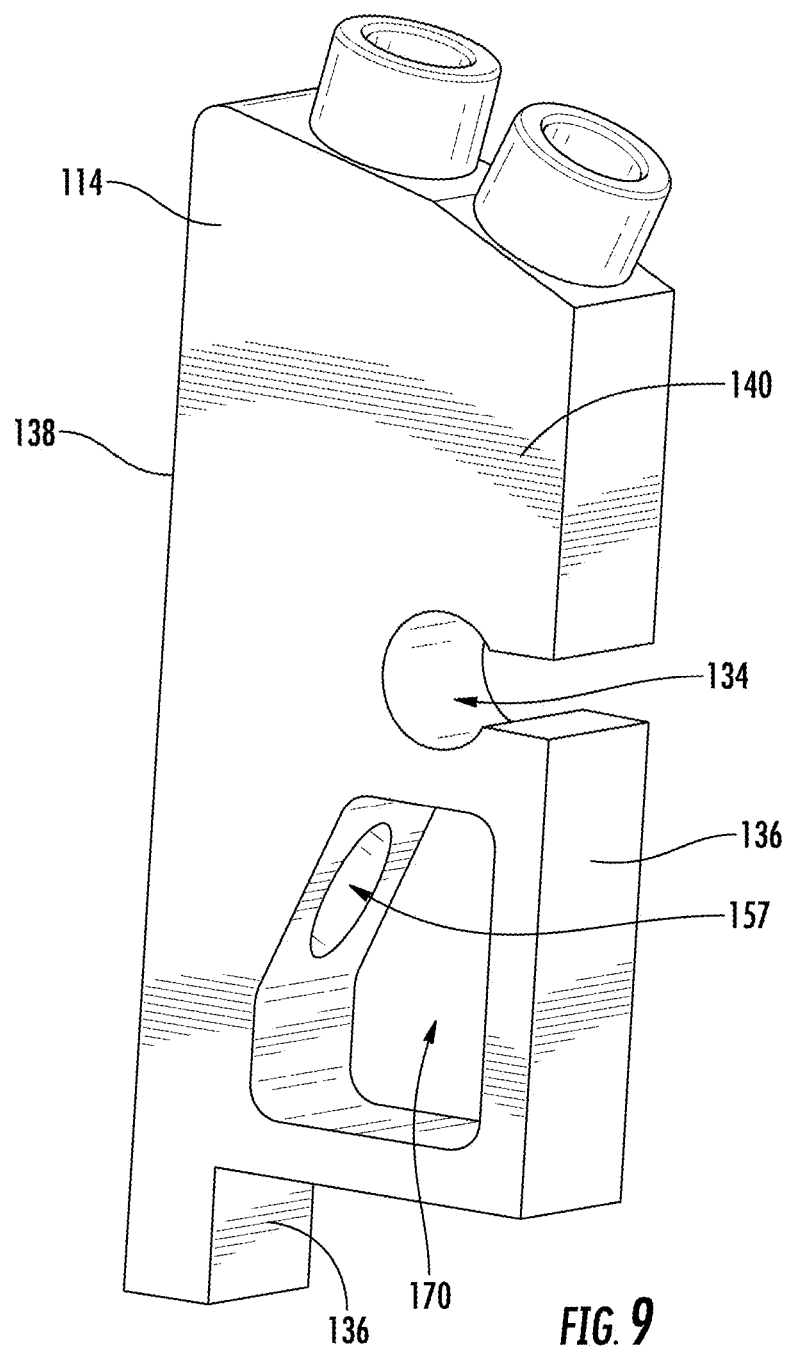

With reference to FIGS. 7-9, the drill guide 114 and particularly the drill guide body 140 includes a vacuum attachment mounting channel 170. The debris evacuation opening 157 is in fluid communication with the vacuum attachment mounting channel 170 and communicates the guide channel 142 with the vacuum attachment mounting channel 170 when the vacuum attachment 158 is removed therefrom.

In this embodiment, the vacuum attachment mounting channel 170 is in the form of a hole extending through the drill guide body 140 that has an inner peripheral shape that mates with and preferably is the same as the outer peripheral shape of the body portion 164 of the vacuum attachment 158. Preferably, these shapes are substantially the same size to allow for sliding interaction but to prevent too much tolerance therebetween.

In this embodiment, the hole, i.e. vacuum attachment mounting channel 170 has a central axis that is parallel to support surface 118 and workpiece support 138 when the drill guides 114, 116 are in a mounted state to base 110.

Preferably, the inner and outer shapes are not rotationally symmetric such that the debris inlet 160 properly aligns with the debris evacuation opening 157 when the vacuum attachment 158 is inserted into the vacuum attachment mounting channel 170.

While the vacuum attachment mounting channel 170 is illustrated as a complete loop, in other embodiments, it need not be complete and could be broken, e.g. C-shaped.

The vacuum attachment mounting channel 170 is configured to slidably receive the vacuum attachment 158 and particularly body portion 164 in a parallel fashion to axis 166 defined by body portion 164. When the vacuum attachment 158 is received in the vacuum attachment mounting channel 170, the debris inlet 160 is in direct fluid communication with debris evacuation opening 157, as discussed previously.

While a single drill guide 114 is discussed above, the vacuum attachment extends through a vacuum attachment mounting channel 170 defined in the drill guide body 140 of each of drill guides 114, 116.

Further, while two drill guides 114, 116 are illustrated, other embodiments could have more or less drill guides. Further, while the drill guides 114, 116 are identical in this embodiment, they could be different. For example, the drill guides could have different numbers of guide channels. Alternatively, one drill guide could have guide channels at different angles. Further yet, the height of the drill bit outlet could be different such that it is positioned at a different height above support surface 118 when mounted to the base.

In some embodiments, the debris inlet 160 could be provided a plurality of openings.

With principle reference to FIGS. 1-3, the clamp assembly 112 is used to clamp workpiece 102 to the drill guides 114, 116 when the pocket hole jig 100 is used in the bench top configuration as illustrated in FIG. 1, as opposed to the portable configuration illustrated in FIG. 5.

The clamp assembly 112 includes an operably actuatable clamp head 180 that is operably driven towards workpiece 102 and drill guides 114, 116 to provide a clamping force 181 to workpiece 102 to hold workpiece 102 in place while the pocket holes are drilled into working surface 106. The clamp head 180 is operably driven by a handle arrangement 182 that pivots to actuate the clamp head 180 towards and away from the drill guides 114, 116.

The handle arrangement 182 includes a handle 184 that is operably coupled to a shaft 186 via a linkage. Pivoting the handle 184 will drive the shaft 186 and the attached clamp head 180. FIG. 13 illustrates the handle 184 in an unclamped orientation.

The clamp head 180 is preferably adjustably mounted to the shaft 186 or fine adjustment of the position of the clamp head 180. This will allow for fine adjustment of the clamp force applied to a given workpiece 102 based on the thickness T1 thereof. This is particularly true as the thickness T1 of workpieces often varies between different pieces.

With reference to FIGS. 13-17, to accommodate larger differences in workpiece thickness T1, e.g. differences in ¼" increments, a mounting system having a slide arrangement and a blocking arrangement is provided to mount the clamp assembly 112 to the base 110.

The mounting system includes a sled 188 that carries the clamp head 180, shaft 186, handle 184 and linkage. The sled 188 is axially slidable relative to base 110 parallel to workpiece support surface 118 and the longitudinal axis defined by shaft 186, e.g. the axis along which the clamping force is applied. This allows for large adjustment in the position of the clamp assembly 112 relative to the drill guides 114, 116.

The sled 188 is guided by a slide member 190 that passes through an aperture formed in the sled 188. The slide member 190 defines an adjustment axis along which the position of the sled 188 is adjustable.

The sled 188 cooperates with a plurality of blocking members 192A-192D to define different axial positions relative to the drill guides 114, 116. The blocking members 192A-192D define axial abutments, e.g. walls, against which an abutment 200 of the sled will selectively interact. e particularly, the user will select which blocking member 192A-192D against which the sled 188, and particularly abutment 200 thereof, will axially abut based on the approximate thickness of the workpiece 102 in which the pocket holes will be formed.

In this embodiment, the blocking members 192A-192D accommodate workpieces 102 having thicknesses T1 of ½", ¾", 1", and 1½", respectively. The adjustments provided by the blocking members 192A-192D are independent of any fine adjustment provided by how the clamp head 180 is mounted to shaft 186. Further, this adjustable positioning is independent of the motion of the handle 184 between the clamped and unclamped orientations.

Three of the blocking members 192A-192C are selectively movable such that they can be transitioned to a position where the sled 188 will not abut the blocking members 192A-192C. In this embodiment, this is done by rotating the blocking members 192A-192C about a rotation axis 194 defined by a mounting pin 196 to which the blocking members 192A-192C are rotatably mounted. More particularly, the mounting pin 196 extends through an aperture formed in the corresponding blocking members 192A-192C.

In this embodiment, axis 194 is parallel to the axis defined by slide member 190 as well as the axis along which the sled 188 slides towards and away from drill guides 114, 116.

Figure 14:
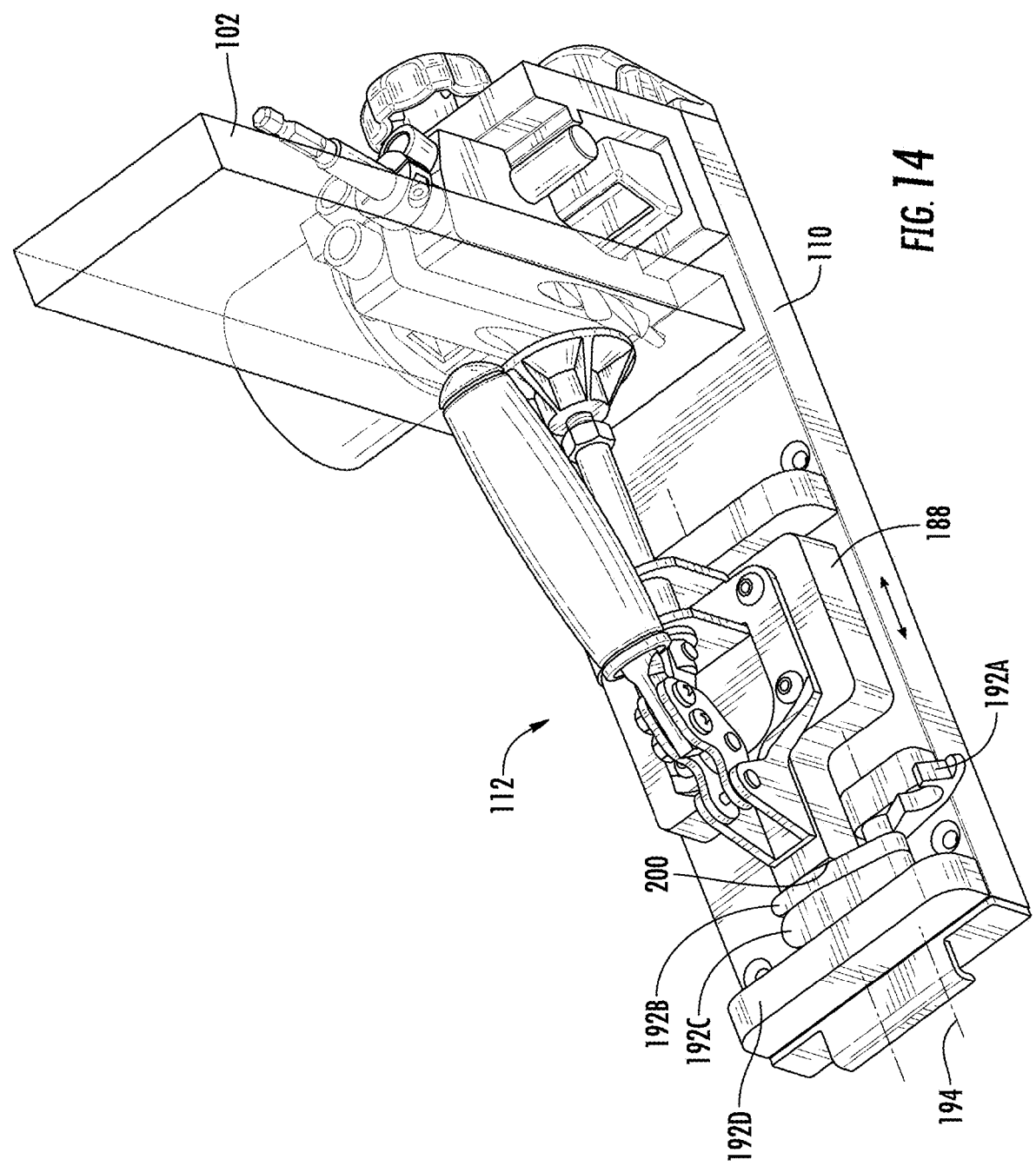
FIG. 14-16 illustrate the pocket hole jig of FIGS. 1 and 2 in different configurations for accommodating workpieces of different thicknesses.
Figure 15:
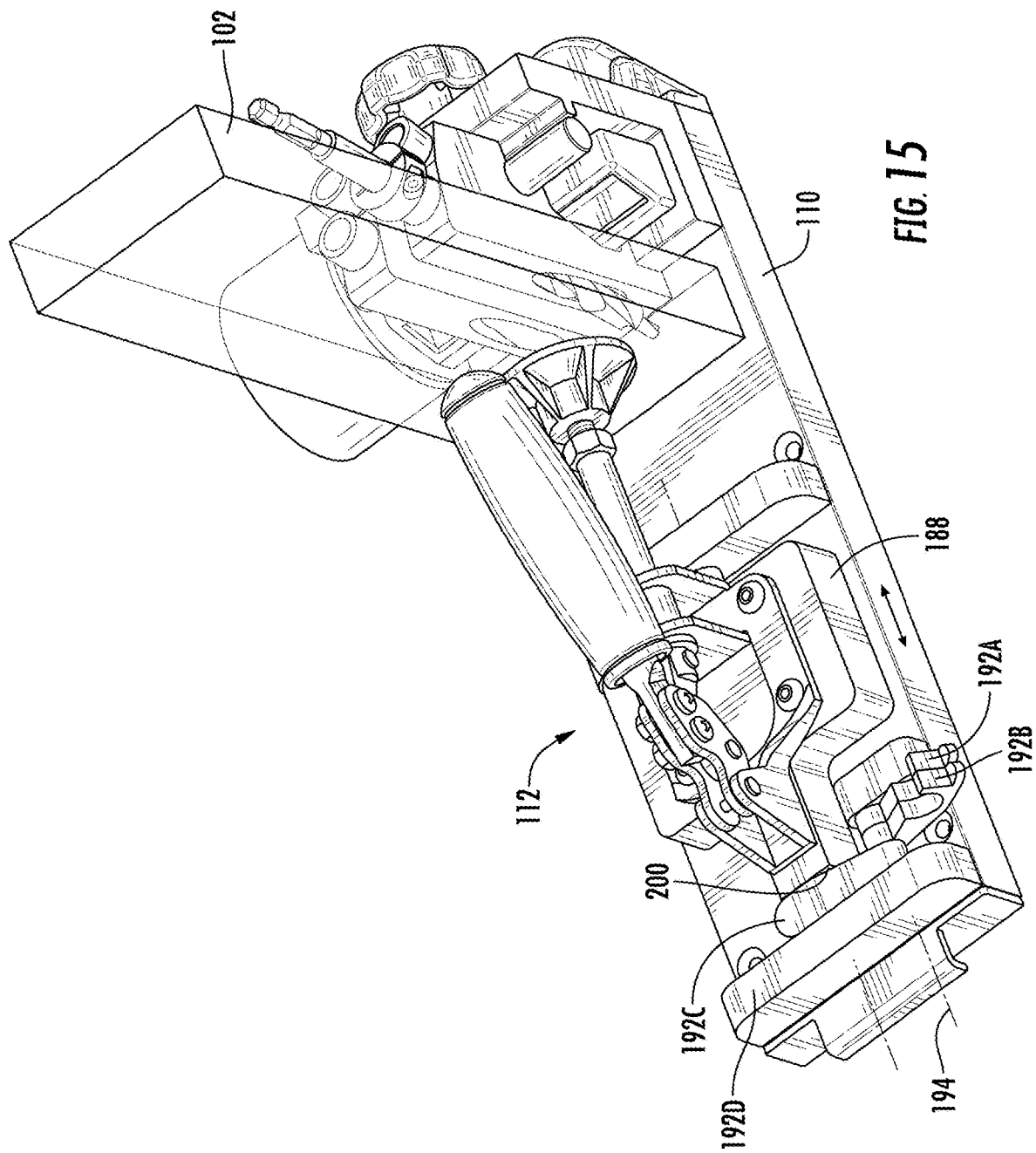
Figure 16:
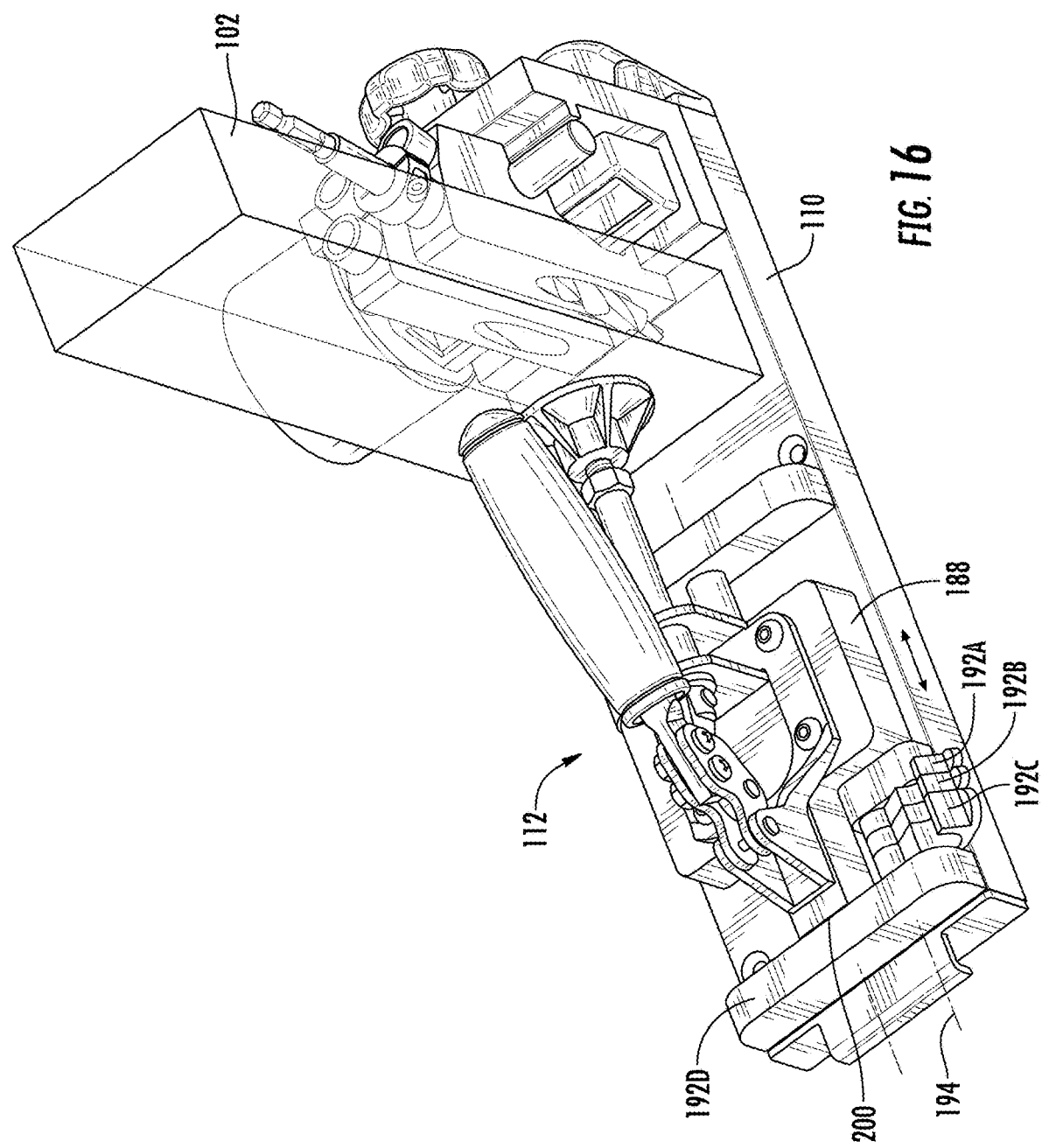

These blocking members 192A-192C are rotatably mounted such that they can be rotated relative to the base 110 from a blocking position (see e.g. FIGS. 1-3) to an unblocking position (see e.g. FIGS. 14-16). When in the unblocking position, the blocking members 192A-192C will allow an abutment 200 of the sled 188 to slide past the blocking members 192A-192C, see e.g. FIGS. 14-16 for various states of unblocking.

While not necessary, each of the movable blocking members 192A-192C include a slide member relief 198A-198C that receives the slide member 190 therein when in the blocking position.

Blocking member 192D also functions as a shaft support that supports one end of shaft 190.

Figure 19:
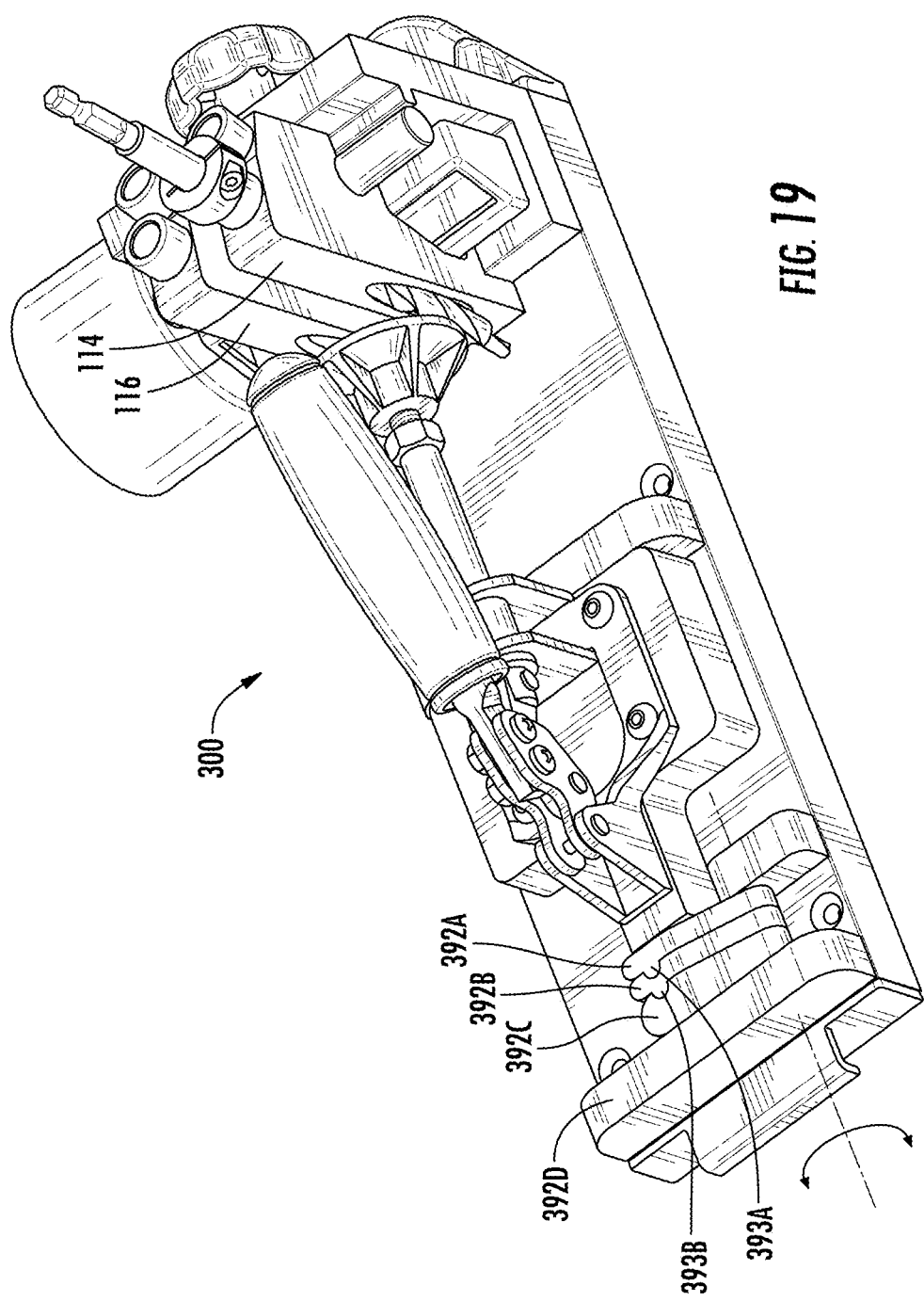
FIGS. 19-21 illustrate updated blocking members that selectively inter-engage when transitioning between blocking and unblocking positions.
Figure 20:
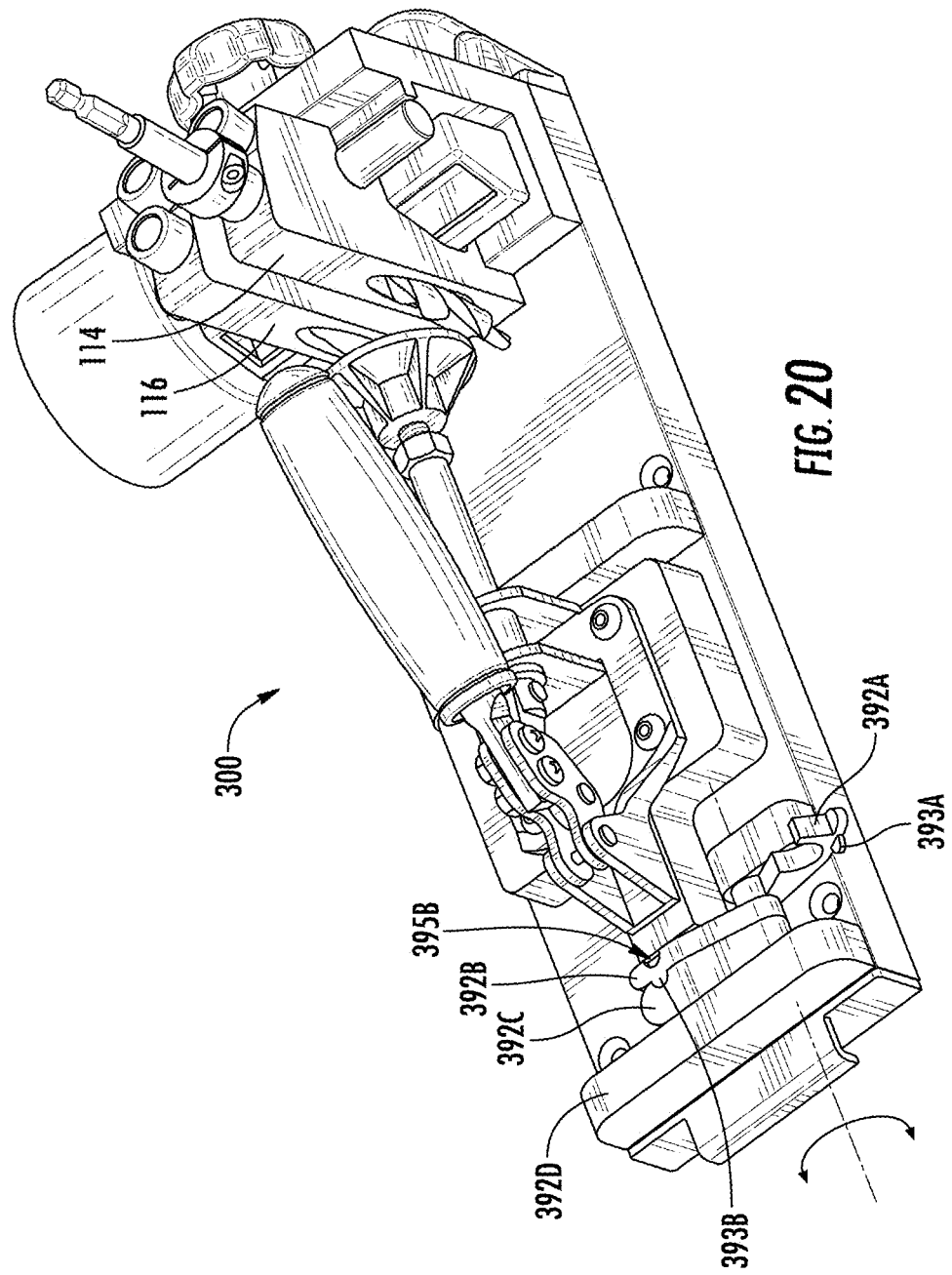
Figure 21:
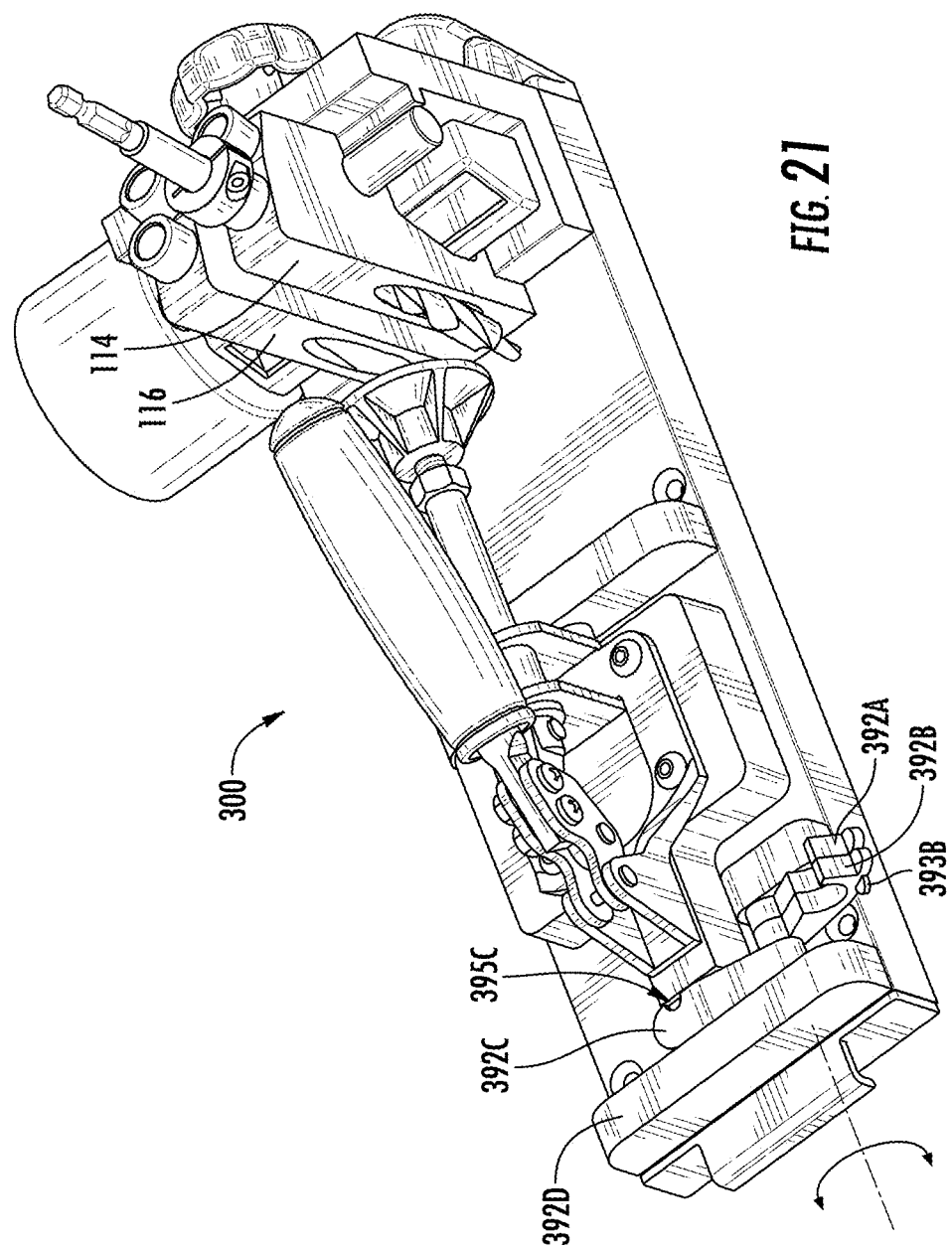

FIGS. 19-21 illustrate an embodiment of a pocket hole jig 300 that is substantially identical to pocket hole jig 100 as described above. The difference between the two pocket hole jigs 100 and 300 relate to the blocking members and particularly to blocking members 392A-392C.

Blocking members 392A-C are configured such that blocking members closer to blocking member 392D cannot be pivoted to the unblocking position while blocking members further from blocking member 392D remain in the blocking position.

More particularly, blocking members 392A and 392B each include a catch in the form of catch tab 393A, 393B that extends over the immediately adjacent blocking member 392B, 392C, respectively, is closer to blocking member 392D, e.g. the blocking member that is further from the drill guides 114, 116.

As such, if a user tries to move blocking member 392C to the unblocking position while blocking member 392B is in the blocking position, blocking member 392C will engage catch tab 393B causing blocking member 392B to rotate towards the unblocking position along with blocking member 392C. Additionally, as blocking member 392B is rotating towards the unblocking position, blocking member 392B will engage catch tab 393A if blocking member 392A is in the blocking position causing blocking member 392A to rotate towards the unblocking position.

This configuration prevents, for example, blocking member 392A to be in the blocking position while blocking member 392B is in the unblocking position. This can prevent the clamping of a workpiece from applying the clamping force to blocking member 392A without that force being properly transmitted to fixed blocking member 392D. This prevents inadvertent damage to the blocking members 392A and 392B that are not immediately adjacent the fixed blocking member 392D.

Blocking members 392B and 392C can have recesses 395B (see FIG. 20) and 395C (see FIG. 21, respectively, that receive catch tabs 393A and 393B, respectively, when the corresponding blocking members 392A, 392B are in the blocking position.

It is noted that the catch tabs 393A and 393B also work in the opposite direction as well. More particularly, blocking member 392A cannot be rotated to the blocking position from the unblocking position without also causing blocking members 392B and 392C to rotate to the blocking position because catch tab 393A will engage blocking member 392B and catch tab 393B will engage blocking member 392C.

It is noted that the catches could be switched such that blocking member 392A need not have a catch but instead blocking member 392C does include a catch. Further, the catches could be separate components attached to the blocking members and be considered part of the blocking members.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pocket hole jig comprising:
a base;
a clamp assembly including an actuatable clamp head;
a first drill guide mounted to the base, the drill guide defining a first workpiece support, the clamp head actuatable towards the first workpiece support to clamp a workpiece between the clamp head and the first workpiece support;
a mounting system mounting the clamp assembly to the base, the mounting system including a slide arrangement and a blocking arrangement, the slide arrangement permitting sliding the clamp assembly along an adjustment axis that is orthogonal to the first workpiece support between at least a first position and a second position defined by the blocking arrangement along the adjustment axis; and
wherein:
the blocking arrangement includes first and second blocking members, the first blocking member defines a first abutment against which the clamp assembly abuts when the clamp assembly is in the first position along the adjustment axis and the second blocking member defines a second abutment against which the clamp assembly abuts when the clamp assembly is in the second position along the adjustment axis;
the second abutment is positioned axially between the first abutment and the first workpiece support along the adjustment axis; and
the second blocking member is movable relative to the base so as to allow the clamp assembly to slide past the second blocking member as the clamp assembly transitions from the second position to the first position as the clamp assembly moves away from the first workpiece support along the adjustment axis;
the second blocking member is operably rotatably attached to the base for rotation between a blocking position and an unblocking position;
when the second blocking member is in the blocking position, the second blocking member blocks the motion of the clamp assembly along the adjustment axis such that the clamp assembly is incapable of transitioning past the second position to the first position; and
when the second blocking member is in the unblocking position, the second blocking member does not block the motion of the clamp assembly along the adjustment axis such that the clamp assembly is capable of transitioning past the second position to the first position.

2. The pocket hole jig of claim 1, wherein the second blocking member rotates about a mounting axis that is parallel to the adjustment axis.

3. The pocket hole jig of claim 2, wherein:
the slide arrangement includes a sled to which the clamp head is operably attached, the clamp head being actuatable to move the clamp head relative to the sled independent of motion of the sled relative to the base between a clamped position and an unclamped position, the sled being selectively moveable relative to the base to transition the clamp assembly between the first and second positions.

4. The pocket hole jig of claim 3, wherein the slide arrangement includes a slide member that extends parallel to the adjustment axis, the sled slides along the slide member between the first and second positions.

5. The pocket hole jig of claim 4, wherein the sled axially abuts the first abutment in the first position and axially abuts the second abutment in the second position.

6. The pocket hole jig of claim 5, wherein the first blocking member is an axially extending shaft support on one end by the first blocking member and the second blocking member extends over the slide member when the second blocking member is in the blocking position and is pivoted away from the slide member when the second blocking member is in the unblocking position.

7. The pocket hole jig of claim 3, wherein the clamp head is adjustably mounted to the sled such that the position of the clamp head relative to the sled is capable of being adjusted independent of actuation of the clamp head between the clamped position and unclamped position and independent of the motion of the sled relative to the base between the first and second positions.

8. The pocket hole jig of claim 1, wherein the first drill guide includes a first guide channel extending through the first workpiece support between a first drill bit inlet and a first drill bit outlet, the first drill guide including a first debris evacuation opening in fluid communication with the first guide channel; and
a vacuum attachment removably mountable relative to the first drill guide, the vacuum attachment having an inlet in direct fluid communication with the first debris evacuation opening.

9. The pocket hole jig of claim 8, wherein the vacuum attachment is removably mountable directly to the first drill guide.

10. The pocket hole jig of claim 9, wherein:
the first drill guide defines a first vacuum attachment mounting channel, the first debris evacuation opening being in fluid communication with the first vacuum attachment mounting channel, at least part of the vacuum attachment being slidably receivable within the first vacuum attachment mounting channel; and
the inlet of the vacuum attachment aligns with the first debris evacuation opening when the vacuum attachment is mounted within the first vacuum attachment mounting channel.

11. The pocket hole jig of claim 10, wherein:
the first vacuum attachment mounting channel is a hole through the first drill guide and defines a first inner peripheral shape; and
the vacuum attachment defines a body portion that defines a first outer peripheral shape that mates with the first inner peripheral shape of the first vacuum attachment mounting channel.

12. The pocket hole jig of claim 11, wherein the first inner and first outer peripheral shapes are the same.

13. The pocket hole jig of claim 8, wherein the vacuum attachment includes a body portion that defines the inlet, the body portion defines an axis along which the first drill guide is adjustably positionable, the inlet of the vacuum attachment and the first debris evacuation opening remain in direct fluid communication when the first drill guide is at different relative positions along the axis.

14. The pocket hole jig of claim 8, further comprising a second drill guide including a second workpiece support and a second guide channel extending through the second workpiece support between a second drill bit inlet and a second drill bit outlet, the second drill guide including a second debris evacuation opening in fluid communication with the second guide channel; and wherein the vacuum attachment is removably mountable relative to both the first and second drill guides simultaneously with the inlet of the vacuum attachment in direct fluid communication with the first and second debris evacuation openings.

15. The pocket hole jig of claim 14, wherein the vacuum attachment includes a body portion that defines the inlet, the body portion defines an axis, the first and second drill guides being adjustably positionable along the axis relative to the body portion, the first and second drill guides being adjustably positionable along the axis relative to one another to adjust a spacing between the first and second drill bit outlets, the first and second debris evacuation openings remain in direct fluid communication with the inlet of the vacuum attachment when the first and second drill guides are at different relative positions along the axis.

16. The pocket hole jig of claim 14, wherein:

the first and second work piece supports are substantially coplanar with one another for supporting a planar surface of a workpiece; and the first and second guide channels extend at a non-parallel and non-perpendicular angle to the first and second workpiece supports.

17. A pocket hole jig comprising:

a base;

a clamp assembly including an actuatable clamp head;

a first drill guide mounted to the base, the drill guide defining a first workpiece support, the clamp head actuatable towards the first workpiece support to clamp a workpiece between the clamp head and the first workpiece support;

a mounting system mounting the clamp assembly to the base, the mounting system including a slide arrangement and a blocking arrangement, the slide arrangement permitting sliding the clamp assembly along an adjustment axis that is orthogonal to the first workpiece support between at least a first position and a second position defined by the blocking arrangement along the adjustment axis;

wherein the blocking arrangement includes first and second blocking members, each blocking member is moveable between a blocking position which inhibits motion of the clamp assembly away from the first drill guide along the adjustment axis and an unblocking position that allows the clamp assembly to move past the blocking member when moving away from the drill guide along the adjustment axis; and further including a catch that operably cooperates with the first and second blocking members such that the second blocking member is incapable of transitioning to the unblocking position without the first blocking member also being in or transitioned to the unblocking position.

18. The pocket hole jig of claim 17, wherein the catch also operably cooperates with the first and second blocking members such that the first blocking member is incapable of transitioning to the blocking position from the unblocking position without the second blocking member also being in or transitioned to the blocking position.

* * * * *